United States Patent [19]

Schuring et al.

[11] Patent Number: 6,012,517
[45] Date of Patent: Jan. 11, 2000

[54] TREATING NON-NATURALLY OCCURRING SUBSURFACE SOIL CONTAMINANTS WITH PNEUMATIC INJECTION OF DRY MEDIA

[75] Inventors: John R. Schuring, Blairstown; Thomas M. Boland, Andover; Trevor C. King, Maplewood, all of N.J.

[73] Assignee: New Jersey Institute of Technology, Newark, N.J.

[21] Appl. No.: 09/064,358

[22] Filed: Feb. 24, 1998

Related U.S. Application Data

[62] Division of application No. 08/690,219, Jul. 26, 1996, Pat. No. 5,908,267.

[51] Int. Cl.[7] .............................. B09C 1/08; B09C 1/10; E21B 43/26
[52] U.S. Cl. ..................... 166/53; 166/177.5; 166/191; 166/223; 166/242.1; 175/67; 405/128
[58] Field of Search .................... 166/53, 191, 177.5, 166/223, 242.1, 242.5, 280, 308, 332.8; 111/7.4; 175/67; 210/170, 747; 405/128; 435/262.5; 588/253, 900

[56] References Cited

U.S. PATENT DOCUMENTS

| | | | |
|---|---|---|---|
| 3,938,600 | 2/1976 | Essmeier | 175/67 X |
| 4,010,801 | 3/1977 | Terry | 166/223 X |
| 4,088,191 | 5/1978 | Hutchison | 166/223 |
| 4,429,647 | 2/1984 | Zinck | 405/128 X |
| 4,945,988 | 8/1990 | Payne et al. | 405/266 |
| 5,032,042 | 7/1991 | Schuring et al. | 405/258 |
| 5,114,277 | 5/1992 | Murphy et al. | 405/231 |
| 5,133,625 | 7/1992 | Albergo et al. | 405/263 |
| 5,240,029 | 8/1993 | Ludewig . | |
| 5,277,518 | 1/1994 | Billings et al. | 405/128 |
| 5,472,049 | 12/1995 | Chaffee et al. | 166/177.5 X |
| 5,560,737 | 10/1996 | Schuring et al. | 405/128 |
| 5,570,973 | 11/1996 | Hunt | 405/128 |

OTHER PUBLICATIONS

Annual Book of ASTM Standards, "Standard Test Method for Penetration Test and Split–Barrel Sampling of Soils."(1994). 04.08:129–133., published by the American Society for Testing and Materials.
McGonigal, 1996, Integration of Pneumatic Fracturing and In Situ Vitrification In Course Grained Soils, A Thesis submitted to the Faculty of New Jersey Institute of Technology.

*Primary Examiner*—George Suchfield
*Attorney, Agent, or Firm*—Klauber & Jackson

[57] ABSTRACT

An apparatus for pneumatically fracturing a soil formation, and thereafter utilizing or maintaining the fracture network thus formed by continuous injection of a gas stream into the fracture network, and introducing into that gas stream dry media which is entrained in the gas stream and thereby dispersed and distributed through the soil formation in substantially predictable or predetermined patterns, is described. The fracture network and/or the dry media contained therein create or enhance usefulness for a given purpose with respect to the soil formation. The primary usefulness of the apparatus is concerned with remediation of contaminated soil formations, although it can be used to inject chemical agents into soil formations for the purpose of managing plant life rooted in those soil formations, to inject propping agents into soil formations for the purpose of maintaining the fracture network in order to create subsurface drainage galleries, and to inject electrically conductive materials for in situ vitrification to create subsurface vitrified masses not only for isolating contaminants within a soil formation, but for use in creating or reinforcing building foundations and supports for other structures, preventing subterranean water movement, and repairing or preventing damage to or leaks from underground electrical power, telephone, television and fiber-optics cables, pipelines for natural gas and oil, water mains and lines, and septic and storm sewer drains.

41 Claims, 18 Drawing Sheets

FIG. 9
FIG. 10
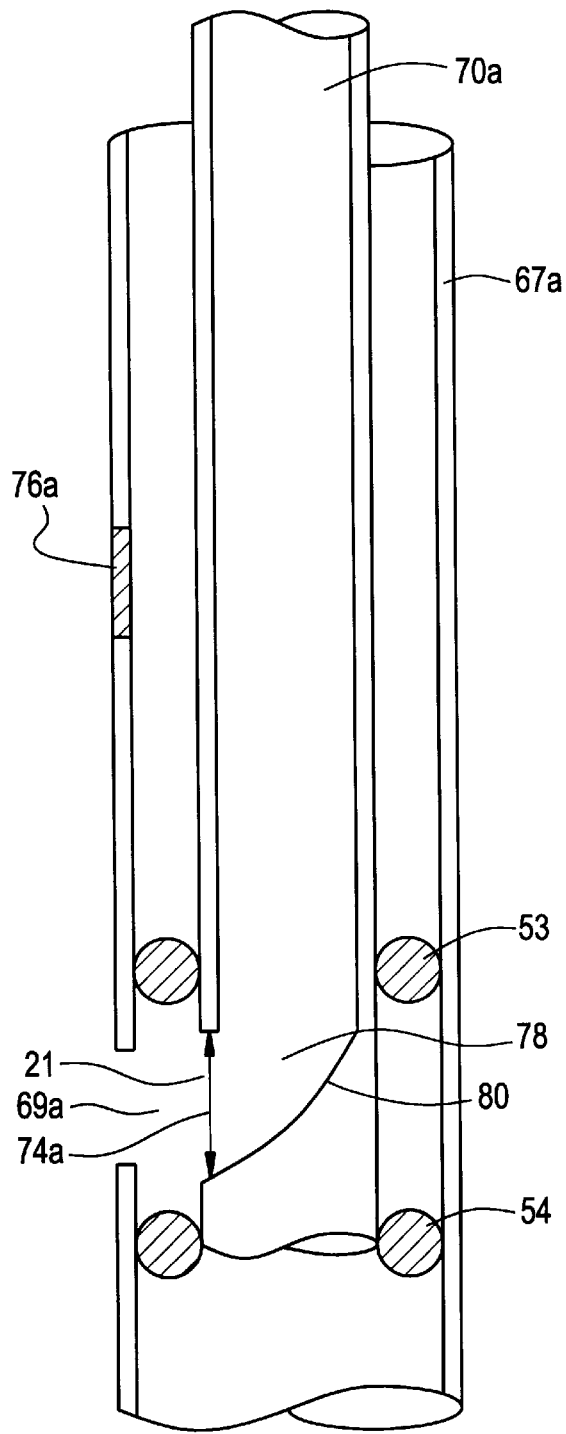
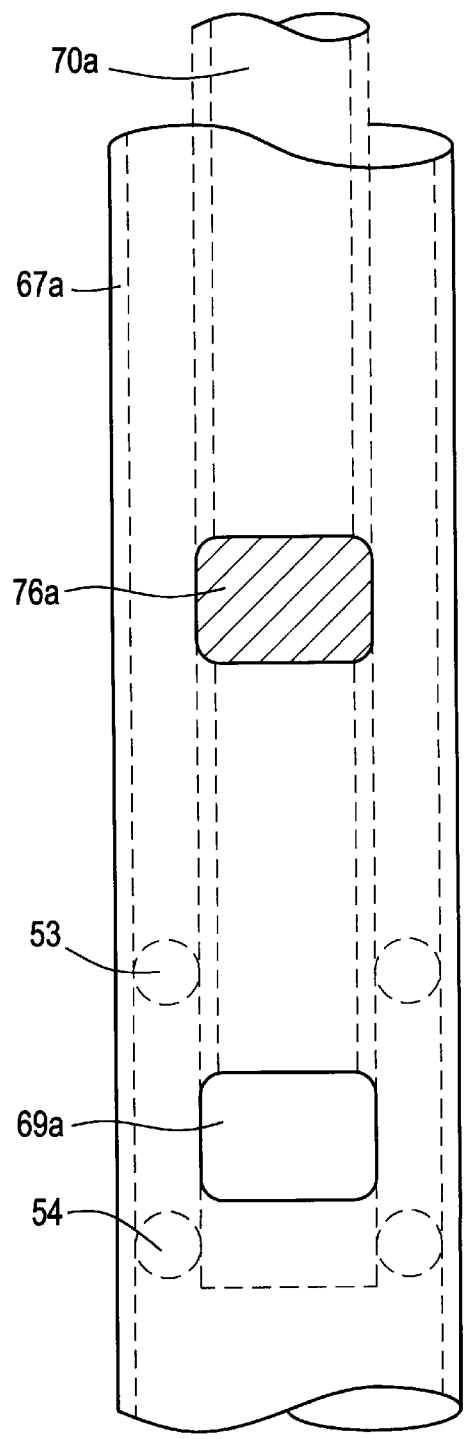

FIG. 11A
FIG. 11B
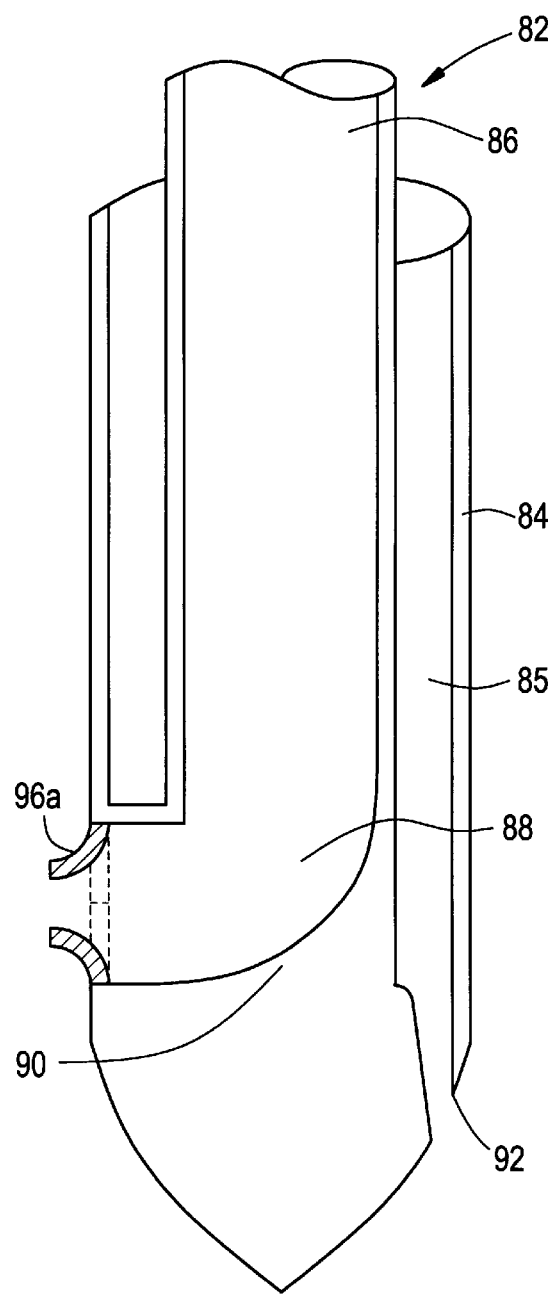
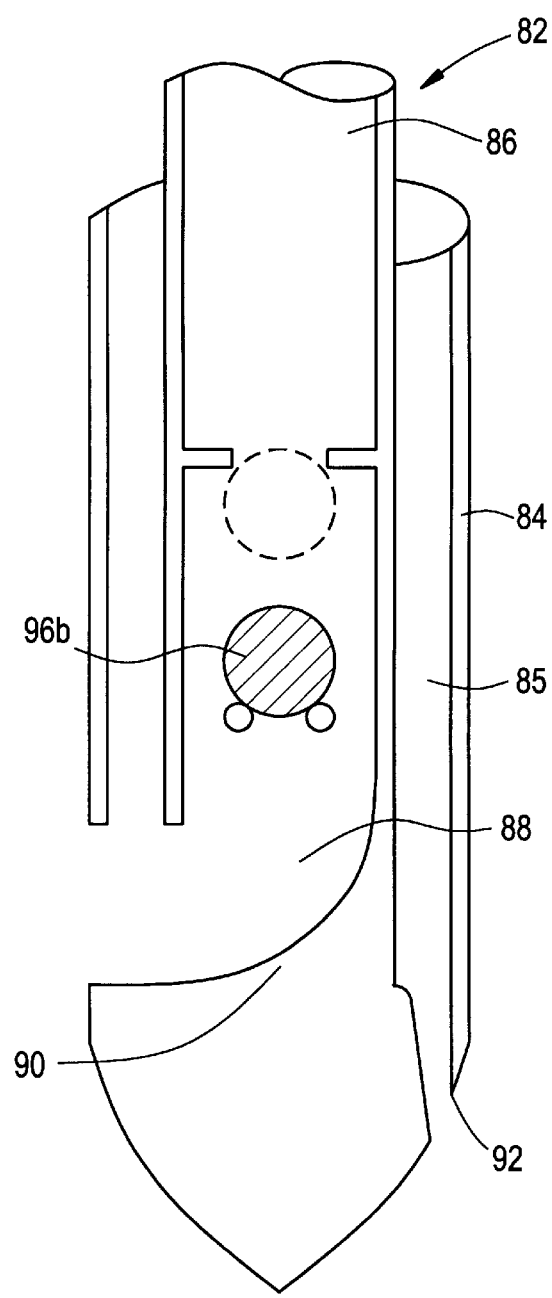

Dilute Phase Injection of Gas/Solids

Dilute Phase Injection of Gas/Solids — Fluidized Zone

Dilute Phase Injection of Gas/Solids

Completely Dispersed Flow | Saltation and Banking

TREATING NON-NATURALLY OCCURRING SUBSURFACE SOIL CONTAMINANTS WITH PNEUMATIC INJECTION OF DRY MEDIA

REFERENCE TO COPENDING APPLICATIONS

This Application is a division of application Ser. No. 08/690,219 filed on Jul. 26, 1996, now U.S. Pat. No. 5,908,267.

Attention is directed to application Ser. No. 08/515,463, filed Aug. 15, 1995, now U.S. Pat. No. 5,560,737, entitled "Pneumatic Fracturing and Multicomponent Injection Enhancement of in Situ Bioremediation".

FIELD OF THE INVENTION

The present invention is in the field of methods and apparatus for treating soil contaminated with non-naturally occurring compositions, especially chlorinated organic compounds, but also including radioactive waste materials, comprising treating the soil in situ without having to remove the soil from the site. The present invention relates to methods and apparatus for in situ subsurface soil remediation of contaminants from the soil by the use of a gas injected into the soil at a given location. The gas injection creates an artificial fracture network in the soil to a substantial radius; and gas injection at high flow rates and velocity is thereafter continued in order to maintain the fracture network in a dilated state. A variety of dry, granular media can be injected into this gas stream, where it becomes suspended and finally deposited throughout the soil formation. The dry, granular media facilitates the soil remediation in a number of novel ways, depending upon its composition, and includes the use of electrically conductive compositions which establish a starter path for in situ vitrification of the soil formation, leading to isolation of the contaminants.

BACKGROUND OF THE INVENTION

The magnitude of subsurface contamination in the United States today is such that it poses a serious threat, both in terms of the health of humans and wildlife near it, and with regard to the environment as well. The state of the technology available to clean-up subsurface contamination sites has often lagged far behind environmental regulations; and when such technology has proven effective, it has also usually been too expensive to employ.

Subsurface contamination may occur in a variety of soil formations. The expression "soil formation" as used herein is intended to mean any geologic formation comprising soil, weathered rock, or sound rock, or any combination of these. Soil comprises unconsolidated mineral grains, while sound rock, i.e., bedrock, comprises consolidated or lithified aggregations of mineral grains. Weathered rock is sound rock in the process of becoming soil through the eroding activity of the elements upon it. The methods and apparatus of the present invention are applicable to all such soil formations, including bedrock. Although bedrock may contain natural fractures and voids, the present invention can be used to significantly increase the number and extent of such fractures and voids.

The subsurface soils comprising the contamination sites to be remediated by present invention are generally divided into two major zones, (1) the unsaturated zone, also known as the "vadose zone" and (2) the saturated zone. Perched water zones are also included. The present invention is fully applicable to, and operable in, both of these zones, and is especially suitable for non-cohesive soils such as granular sands and gravels, which do not fracture, in the conventional meaning of the term. The vadose zone extends from the ground surface down to the ground water table. The saturated zone begins at the ground water table and extends to a further depth. The vadose zone may be further divided into additional subzones, but will be treated as a single zone in the present discussion. Since the vadose zone is the uppermost layer of the terrestrial environment, it is more likely to contain pathways for toxic and hazardous chemicals to enter groundwater systems.

Studies have shown that it is less costly to remove volatile organic compounds (VOCs) from the vadose zone than to pump and treat contaminated ground water. That is the reason for the current focus on technology for the in situ removal of VOCs from the vadose zone. Such treatment technologies include vapor extraction, biodegradation, soil washing and thermal treatment. Vapor extraction is a process for the in situ removal of VOCs by mechanically extracting soil gases from the vadose zone through one or more vertically oriented perforated vent wells installed in the contaminated zone. Air is forced to travel through the pore space in the soil, causing volatilization of the liquid and adsorbed volatile organic compounds. The extracted soil gases are then either vented to the atmosphere or into an emission control system, depending on the concentration. The two major embodiments of such vapor extraction processes which have been demonstrated successfully in field use are in situ air stripping and vacuum extraction. In situ air stripping employs a series of interconnected air injector vents which are supplied with forced air by an above ground blower and manifold system that forces the air into the soil through the perforated vent wells. A separate blower or vacuum pump and manifold system is used to apply negative pressure to air extraction vents to withdraw the soil gases. The injection and extraction vents are located alternately within the array of vent wells on the site. This approach functions best with highly permeable soils, e.g., loose, sandy soils and has proven to be much less effective in tightly packed soils and in soils with a high clay content.

Biodegradation is another process which has been used effectively in the treatment of soils contaminated with organic compounds. In biodegradation, or bioremediation, the ecological conditions in the soil are altered to enhance microbial catabolism or to cometabolise the organic contaminant, thus transforming it into a simpler, non-toxic product. Indigenous microorganisms are utilized most often, although seeding of the soil with exogenous microorganisms is also possible. Microorganisms are either aerobic, anaerobic, or facultative anaerobic, which can grow either in the absence or presence of oxygen. The most effective treatment has been the aerobic microbial process. With this process, oxygen and often nutrients are injected or infiltrated into the subsurface environment, using wells or a percolation process. The major factors which affect the rate of biodegradation in the vadose zone include: pH, temperature, water content, carbon content, clay content, oxygen, nutrients, the nature of the microbial population, acclimation and concentration. However, unfavorable reaction kinetics, low substrate concentration and slow degradability of certain compounds remain significant problems.

Another major limiting factor in bioremediation has been the low permeability of the fine-grained soil layers present at many sites. On the other hand, a site contaminated with methylene chloride, n-butyl alcohol, acetone and dimethylaniline, after three years of in situ aerobic biological treatment, has had its contaminant plume reduced by 90%. Reclamation of an aquifer contaminated with benzene, toluene, and xylene using biodegradation has been achieved, with emphasis on the importance of oxygenating the subsurface environment, and in particular obtaining superior rates of biodegradation using hydrogen peroxide as an oxygen donor, compared to using the traditional technique of air sparging.

A method and apparatus for establishing, maintaining and enhancing microorganisms utilized to remediate groundwater or soils contamination through the injection of nutrients and gases, using a cylindrical head with radial apertures and a pointed lower end adapted to penetrate the soil, and through which a fluid can be delivered, is disclosed in Albergo et al. U.S. Pat. No. 5,133,625. The fluid, which may be a viable microorganism culture containing nutrients, or may be a gas which permits or enhances the growth of ambient microorganisms, is introduced into a subsurface location under pressure through the apertures in the cylindrical head. The pressure is provided by a pump or other means, and is adjustable. However, Albergo et al. does not suggest the use of dry media in accordance with the particular dictates of the present invention. In Billings et al. U.S. Pat. No. 5,277,518 it is suggested that an oxygen-containing gas can be used to provide microorganisms and nutrients to the subsurface, and that injection wells can be connected to an air compressor for this purpose. In Payne et al. U.S. Pat. No. 4,945,988, a sparging process and apparatus is modified by placing an oxygen separator along conduit lines leading to an aquifer downstream of an air pump, which permits the delivery of air which is substantially oxygen free to the aquifer, or is oxygen enriched to the vadose zone, thereby preventing growth of aerobic bacteria in the aquifer, while stimulating such growth in the vadose zone. In neither of these disclosures, however, is there any suggestion of pneumatic injection of dry media and the formation of discrete granular lenses in the formation, which are continuous between the injection point and adjacent vent wells in the formation, as is provided by the present invention.

Another approach taken in the art to remediating contaminated soil formations in certain situations, especially where radioactive waste contamination is involved, is to isolate the contaminated waste site by placing around it a vitrified underground structure. This is accomplished by solidification of soil by in situ melting and vitrification using heat generated in the soil itself between spaced electrodes. An improvement in this process is described in Murphy et al. U.S. Pat. No. 5,114,277, which places an initially electrically conductive material at the desired location and depth to start up vitrification underground and cause the melt to have a substantially planar shape. However, unlike the methods utilized in the present invention, the initially electrically conductive material is transported as a slurry or in a solution through horizontal boreholes, or by means of conventional hydraulic subsurface fracturing technology well known in the drilling arts.

Paramount among the limitations of the existing and emerging treatment technologies applicable to the vadose zone is the permeability of the soil formation being treated. The efficiency of in situ treatment processes all decrease as the soil permeability decreases. For soils with low permeabilities the existing processes are largely ineffective. Low soil permeability may be caused by a number of factors, including high clay content, high soil density and high fluid viscosity. An advance in this area was made by Schuring et al., U.S. Pat. No. 5,032,042, with the discovery that pneumatically fracturing of the contaminated soil formation leads to a significant improvement in the results obtained with a variety of in situ decontamination methods. However, there is no suggestion by Schuring et al. of pneumatic injection of dry media and of the techniques required for doing so, or of the manner in which a variety of such dry media may be used to enhance various remediation technologies.

The method described by Schuring et al. for eliminating subsurface contaminants from soil includes the steps of a) pneumatically fracturing the soil, including the steps of i) inserting a tubular probe partially into a well in the soil such that at least one orifice of a nozzle fluidly connected with the tubular probe is positioned at a predetermined height; ii) providing a sealed area in the well on opposite sides of the orifice; and iii) supplying a pressurized gas to the tubular probe which travels through the orifice into the soil to produce a fractured soil formation; and b) transforming the contaminants into a different state to decontaminate the soil, after creation of the fractured soil formation. There is also described therein in general terms the use of such pneumatic fracturing to provide nutrient seeding, although this is not defined, and there is no disclosure of specific devices and methods which might be used to accomplish this general objective.

For the present invention, on the other hand, there is provided herein ample description of such features as novel directional and plate-type nozzles which are able to focus high flow velocities into the soil formation, creating planar voids of substantially 360° circumference, or of sectional arcs thereof, by a rapid pneumatic intrusion and cutting action, whereafter dry media in a dry carrier gas are injected rapidly to fill the formation, in accordance with the guidelines provided herein. The present invention can be used in a number of ways to obtain increased rates of contaminant reduction, removal, or isolation which are dramatic.

SUMMARY OF THE INVENTION

In its broadest scope, the present invention is contemplated to comprise a method for pneumatically fracturing a soil formation, and thereafter utilizing or maintaining the fracture network thus formed by continuous injection of a gas stream thereinto, and introducing into that gas stream dry media which is entrained in the gas stream and thereby dispersed and distributed through the soil formation in substantially predictable or predetermined patterns, whereby the fracture network and/or the dry media contained therein create or enhance usefulness for a given purpose with respect to said soil formation. Although the present invention is primarily concerned with remediation of contaminated soil formations, the methods and apparatus of the present invention are applicable to a wide range of activities and can bring beneficial solutions to a number of problems that arise in connection with soil formations.

For example, the methods and apparatus of the present invention can be used to inject chemical agents into soil formations for the purpose of managing plant life rooted in those soil formations, especially larger plants such as trees, shrubs and other nursery stock with substantial root systems that penetrate the soil formation to a significant depth. This plant life management can be either for the purpose of encouraging and sustaining the healthy growth of such plant life, or for the purpose of eradicating it. Thus the chemical agents which are injected into the soil formation in accordance with the present invention comprise nutrients, e.g., fertilizers, trace minerals, plant growth regulants including root stimulants, compounds that improve the uptake of such nutrients, compositions which improve the texture, workability or friability of the soil, e.g., humus, manure, and biodegradable materials such as saw dust, ground shells, shredded bark and the like, and beneficial microorganisms such as nitrogen-fixing bacteria; protective agents, e.g., anti-viral, antifungal and anti-bacterial agents, insecticides, miticides, nematocides, acaricides and other pesticides, or any other compound which can treat or prevent a plant disease when taken up through the root system of that plant; and herbicides which, when taken up through the root system of the plant, will lead to eradication of that plant. This wide range of activities and beneficial effects make the methods and apparatus of the present invention especially useful in a number of commercial and industrial enterprises, from the care and management of farms, parks, forest tracts, nurseries, golf courses, large estates and resorts, to the concerns of the individual homeowner.

As another example, the methods and apparatus of the present invention can be used to inject propping agents, e.g., sand, fine gravel, saw dust, and ground shells, into soil formations for the purpose of maintaining the fracture network created by the pneumatic fracturing in order to create subsurface drainage galleries. This drainage network can serve a number of useful purposes, e.g., improving access to water by the root system of affected plants, improving the drainage in poorly drained soil formations in order to restore the usefulness of affected surface areas, and rehabilitating septic systems and affected drainage fields. The in situ vitrification method of the present invention can be used to create subsurface vitrified masses not only for the purpose of isolating contaminants within a soil formation, but for other beneficial objectives as well. These include use in construction, e.g., to create or reinforce building foundations and supports for other structures; use in preventing subterranean water movement in order to improve the viability of lakes, streams and ponds or reduce the incidence of sinkholes and the flooding of mines; and use in the repair of, or prevention of damage to, or leaks from, underground electrical power, telephone, television and fiber-optics cables, pipelines for natural gas, oil and other fluids, and water mains and lines and septic and storm sewer drains.

Where the methods and apparatus of the present invention are used to remove or isolate subsurface contaminants, the soil formation will especially be one which is contaminated with non-naturally occurring compositions, especially chlorinated organic compounds, i.e., hydrocarbons, and is therefore in need of remediation. The dry media may be selected from a number of different classes of compounds comprising a large number of species, and will usually be under pressure at the point of entrainment. Depending upon the transport mechanism involved in the movement of the dry media into the pneumatically fractured soil formation, the continuous injection of the gas stream into the fractured soil formation may serve to maintain the formation in a dilated state.

The method of the present invention has a number of resultant utilities, depending on the composition of the dry media, the nature and composition of the fractured soil formation, and the identity and concentration of whatever contaminating compounds may be present. For example, reducing or eliminating non-naturally occurring contaminants may be accomplished by establishing an in situ bioremediation cell within a soil formation to degrade the contaminants. This method employs as the dry media, nutrient material which will enhance the growth and activity of microorganisms already present in, or added to the contaminated soil formation, which are capable of eliminating or reducing the contaminants by degrading or transforming them. These nutrient materials may comprise inocula, agents to generate the desired pH, buffers to maintain said pH, and nutritive substances, especially those with a time release coating which can often be fragile, especially under harsh injection conditions. As another example, injection of chemically reactive dry media, e.g., zero valence metals, into a soil formation containing non-naturally occurring contaminants would be useful because of the ability of such media to react directly with said contaminants, leading to their reduction by chemical and/or biological processes. Such a method, in accordance with the present invention, can be used to either replace or supplement the reactive trench systems which are currently being employed for that purpose. As another example, where the dry media comprises a mixture of graphite particles and glass frit, it may be used to establish an electrical conductive resistance pathway through selected portions of the soil formation to which electrical energy is then applied, which results in resistance heating and vitrification of the selected portions of the soil formation, which in turn results in encapsulation or some other equivalent isolation of whatever contaminating compounds may be present in the soil formation.

Accordingly, the present invention provides a method for pneumatically injecting substantially dry media into a soil formation, which includes the steps of a) pneumatically fracturing the soil formation, including the steps of i) inserting a tubular probe partially into the soil formation such that at least one orifice of a nozzle fluidly connected with the tubular probe is positioned at a predetermined height; and ii) supplying a pressurized gas on a continuous basis into the tubular probe such that the resulting pressurized gas stream travels through the at least one orifice into the soil to produce a fracture network in said soil formation; b) preserving said fracture network in a dilated state or otherwise thereafter utilizing said fracture network, by maintaining continuous injection of said gas; c) introducing substantially dry media into said gas stream from an optionally pressurized supply of said dry media, while maintaining the gas to media ratio in the range of from about 100 to 1 to about 10,000 to 1 on a volume to volume basis in order to assure adequate dispersion and distribution of the dry media through the soil formation in predetermined patterns; d) continuing injection of said dry media into said fracture network until the desired amount and predetermined distribution pattern for said dry media have been achieved; and e) as desired or necessary, repeating steps a) through d) on a sequential basis in order to treat additional portions of said soil formation.

The present invention provides a method for pneumatically injecting substantially dry media into a soil formation as described above, wherein the pressurized gas is compressed air; wherein there is utilized additionally a nozzle fluidly connected with the tubular probe, said nozzle being a high velocity directional nozzle capable of delivering the pressurized gas to all or any significant circular section, i.e., arc of the surrounding soil formation, i.e., from about 15° to substantially 360°, the section being either defined and fixed, or else being determinable and selectable by operation of the nozzle, including a substantially planar nozzle whose injection aperture is a 360° opening of a predetermined height, and wherein the internal junction of the nozzle means with the tubular probe comprises a forcing cone having a uniform parabolic or functionally similar slope to provide maximum acceleration to the gas stream and its entrained dry media immediately before entry into the soil formation; and wherein said dry media comprises one or more members selected from the group consisting of 1) silica, including sand and glass frit; 2) carbon, including graphite and powdered charcoal; 3) powdered metals including copper, nickel, tin, zinc, iron, magnesium, aluminum, phosphorus, chromium, cadmium, palladium, platinum, or alloys and salts thereof; 4) beads and particles of synthetic resin, including polymers, copolymers and terpolymers, e.g., polyacrylates including those prepared from acrylic and methacrylic acid; polyolefins including those made from ethylene, propylene, and butylene; polyvinyl chloride; polystyrenes; polyesters; polyimides; polyurethanes; polyamides; and polycarbonates; and mixtures of any of these; 5) organic compounds capable of remediating a soil formation contaminated with non-naturally occurring compositions, especially chlorinated organic compounds, i.e., hydrocarbons, by oxidizing, reducing, or neutralizing said non-naturally occurring compositions, e.g., dechlorinating chlorinated hydrocarbons, by reacting with said non-naturally occurring compositions to produce non-contaminating reaction products, and by catalyzing the chemical transformation of said non-naturally occurring compositions into non-contaminating products, including catalysis by enzymatic action; and 6) compositions which promote the growth and activity of microorganisms in the chosen soil formation, e.g., direct release or time release nutrient pellets, buffers, oxygen sources and inocula in granular or particulate form.

Where the dry media comprises sand or glass frit, for example, the method of injecting dry media of the present invention may be used to remediate preselected soil formations, because the injected dry media completely fills the pneumatically induced fracture network in those soil formations, forming a discrete granular lens. This granular lens is also referred to herein as a media lens, since it is formed through the instrumentality of the dry media. Such a granular or media lens comprises a matrix within the soil formation consisting of voids and channels, and the matrix has a double-convex or related type of shape. Typically, a media lens will extend in a planar manner, usually for several feet, into the soil formation. Together, the lenses thus formed can be made continuous between the injection point of the dry media and adjacent extraction wells installed in the formation, through which the contaminants, particularly volatile organic contaminants, can be removed in a typical vapor extraction or pump and treat system.

Accordingly, the present invention provides a method for reducing, eliminating or isolating non-naturally occurring, subsurface, liquid or solid contaminants from one or more soil formations, which includes the steps of a) pneumatically fracturing said soil formation(s), including i) inserting a tubular probe partially into the soil formation such that a nozzle fluidly connected with the tubular probe is positioned at a predetermined height, wherein said nozzle is a high velocity substantially planar nozzle whose injection aperture is a 360° opening of a predetermined height, or is a directional nozzle comprising a preselected or determinable fraction of the 360° opening, and whose internal junction with said tubular probe comprises a forcing cone having a uniform parabolic or functionally similar slope to provide maximum acceleration to said gas steam and dry media to be entrained therein immediately before entry into the soil formation; and ii) supplying a pressurized gas on a continuous basis into the tubular probe such that the resulting pressurized gas stream travels through said aperture of said nozzle into the soil to produce a fracture network in said soil formation(s); b) preserving said fracture network in a dilated state or otherwise thereafter utilizing said fracture network, by maintaining continuous injection of said gas; c) introducing substantially dry media into said gas stream from an optionally pressurized supply of said dry media, while maintaining the gas to media ratio in the range of from about 100 to 1 to about 10,000 to 1 on a volume to volume basis, in order to assure adequate dispersion and distribution of the dry media through the soil formation in predetermined patterns; d) continuing injection of said dry media until suitable amounts and predetermined distribution pattern for said dry media have been achieved; and e) as desired or necessary, repeating steps a) through d) on a sequential basis in order to treat additional portions of said soil formation(s); and where said contaminants are being reduced or eliminated, f) maintaining a low volume flow of said pressurized gas throughout said fracture network and adjacent portions of said soil formation(s), optionally with the assistance of means for exerting reduced pressure thereon, for a time sufficient to oxidize, reduce, neutralize, transform by reaction or catalysis or otherwise degrade and/or remove said contaminants from said soil formation(s); or where said contaminants are being isolated, using in situ vitrification as the means for producing such isolation, comprising: g) using as the dry media one or more compositions which when dispersed and distributed in the soil formation in suitable amounts and predetermined patterns create conductive resistance starter paths; and h) applying electrical current to the conductive resistance starter paths using at least two electrodes suitably placed in the soil formation, in an amount and for a time sufficient to produce electrical resistance heating of the soil formation in a melt zone between the electrodes to a temperature above the melting point of all or a portion of the soil formation sufficient to produce a solid, vitrified, isolating mass. The gas stream which is used in the initial pneumatic fracturing and then in the continuous flow during which the dry media is introduced, is preferably not oxidizing or oxygen containing, since oxygen will have a tendency to oxidize the materials from which the conductive resistance starter path is made under the conditions of vitrification, thus creating an open circuit and preventing further vitrification.

It should be pointed out the choice of the gas or mixture of gases which comprise the pressurized carrier gas stream for the dry media will be largely dependent upon the properties and purpose of the dry media involved, as well as, to some extent, the type of soil formation involved. For example, it was just mentioned that oxygen would not be especially suitable for use with the mixture of graphite and glass frit used for in situ vitrification. Where the dry media is reduced iron particles, i.e., elemental Fe, for dechlorinating a soil formation contaminated with, e.g., trichloroethylene (TCE), an oxidizing atmosphere should also be avoided to prevent any unwanted side reaction with the iron particles. In this case, nitrogen, $N_2$, is a suitable choice for the carrier gas. Another important factor to be considered is the potential for any undesirable interaction between the gas carrier and the dry media entrained therein. The gas carrier should be inert, at least with respect to its effect on the dry media composition. Economics will also, of course, be of considerable significance in making the choice of carrier gas.

The present invention provides a method for reducing, eliminating or isolating non-naturally occurring, subsurface, liquid or solid contaminants from one or more soil formations having low initial permeability as described above, wherein the pressurized gas is compressed air; wherein the reduced pressure exerted on the fracture network and adjacent portions of the soil formation(s) is created by one or more extraction wells having vacuum pumps attached thereto; and wherein one or more vent wells are created to supply additional amounts of air to the soil formation(s).

There is further provided in accordance with the present invention a method for reducing, eliminating or isolating contaminants in soil formations as described above, wherein the soil is a non-cohesive soil, e.g., granular sands and gravels which do not exhibit brittle behavior and, consequently, usually fail to form a fracture network. This method is facilitated by the high velocity substantially planar nozzle of the present invention, whose injection aperture is substantially a 360° opening of a predetermined height, and whose internal junction with said tubular probe comprises a forcing cone having a uniform parabolic or functionally similar slope to provide maximum acceleration to said gas steam and dry media to be entrained therein immediately before entering the soil formation. This nozzle creates planar voids by an action which may be described as pneumatic intrusion, or pneumatic cutting, whereby a fracture network is established and by means of which the dry media is injected into, and the contaminants may be removed from, the soil formation. In another embodiment of this nozzle of the present invention, instead of being substantially planar, i.e., at about a 90° angle to the vertical tubular probe, the portion of the nozzle having the 360° aperture slopes upward and/or downward and thus has an angle of less than and/or greater than 90° with respect to the vertical tubular probe, from about 30° to about 80° and/or from about 100° to about 150°.

Another method within the scope of the present invention is one for reducing or eliminating non-naturally occurring, subsurface, liquid or solid contaminants from one or more soil formations by establishing an in situ bioremediation cell therein to degrade said contaminants. This method follows the general procedures described above for other methods, but employs as the dry media, nutrient material which will enhance the growth and activity of microorganisms present in the contaminated soil formation, which are capable of eliminating or reducing the contaminants by degrading or transforming them. These nutrient materials may comprise inocula, agents to generate the desired pH, buffers to maintain said pH, and nutritive substances, especially those with a time release coating which can often be fragile, especially under harsh injection conditions. It is also necessary that the gas which is injected continuously be one which is oxygen-containing, e.g., compressed air or oxygen, where the microorganism whose growth and activity are being promoted is an aerobic microorganism. Where the microorganism is anaerobic, on the other hand, a non-oxygen containing gas, e.g., nitrogen, must be used.

Yet another method within the scope of the present invention is one for reducing or eliminating non-naturally occurring, subsurface, liquid or solid contaminants from one or more soil formations by introducing therein chemical agents which reduce, oxidize, neutralize, cleave, decompose, chelate, complex, catalytically transform, or otherwise entering into chemical reactions with said contaminants whereby the qualities which make them undesirable contaminants are permanently altered. This method follows the general procedures described above for other methods, but employs as the dry media, a reactive chemical agent of some type. The specific chemical agent selected will be determined to a large extent by the composition of the contaminant present in the soil formation.

Yet another method within the scope of the present invention is one for isolating non-naturally occurring, subsurface, liquid or solid contaminant zones within one or more soil formations by creating vitrified underground structures which produce such isolation, either by encasement or otherwise. This in situ vitrification is accomplished by using as the dry media in the method of the present invention described above, one or more compositions which will produce the amount of electrical conductivity and electrical resistance necessary to result in the creation of conductive resistance starter paths. The dry media compositions are applied in amounts and predetermined patterns, at any depth, and at any location in the soil formation, which will produce the desired isolation after vitrification takes place. Thereafter, electrical current is applied to the soil formation through the conductive resistance starter paths by the use of electrodes in a conventional manner. As mentioned previously, the gas stream which is used in the initial pneumatic fracturing and then in the continuous flow during which the dry media is introduced, is preferably not oxidizing or oxygen containing, since oxygen will have a tendency to oxidize the materials from which the conductive starter path is made under the conditions of vitrification, thus creating an open circuit and preventing further vitrification.

Another method within the scope of the present invention is one for reducing or eliminating non-naturally occurring, subsurface, liquid contaminants from one or more soil formations which do not exhibit self-propping behavior, e.g., softer, sensitive clays, wherein there is used as the dry media a granular propping agent, e.g., sand, fine gravel, saw dust, and ground shells. The method creates and maintains a continuous plane of fluid flow channels which establish connectivity in the soil formation and thereby accelerate contaminant treatment by conventional techniques such as the pump and treat system, or other methods of the present invention described herein.

There is further provided in accordance with the present invention an apparatus for pneumatically injecting substantially dry media into a soil formation, which includes 1) fracturing means for pneumatically fracturing the soil formation, the fracturing means including a) tubular probe means for receiving i) a pressurized gas, the probe means including ii) a soil penetrating portion adapted to be inserted in a well or casing in the soil formation, and iii) an above soil portion in fluid communication with the soil penetrating portion, the soil penetrating portion including tube means for receiving the pressurized gas; b) sealing means, especially first and second packer means connected with the tube means for pressing against walls of the well or casing so as to provide a sealed area in the well or casing between the first and second packer means; c) nozzle means preferably positioned in the sealed area in fluid communication with the tube means for supplying the pressurized gas to the soil formation, said nozzle means fluidly connecting the soil formation with the tubular probe means, and being a high velocity directional nozzle capable of delivering the pressurized gas to all or any significant circular section, i.e., arc of the surrounding soil formation, i.e., from about 15° to substantially 360°, the section being either defined and fixed, or else being determinable and selectable by operation of the nozzle, including a substantially planar nozzle whose injection aperture is a 360° opening of a predetermined height, and wherein the internal junction of the nozzle means with the tubular probe comprises a forcing cone having a uniform parabolic or functionally similar slope to provide maximum acceleration to the gas stream and dry media entrained therein immediately before entering the soil formation; and d) pressurized gas supply means for supplying the pressurized gas to the above soil portion of the tubular probe means, wherein the pressurized gas travels through the nozzle means into the soil to produce a fracture network; and 2) means for introducing one or more dry media compositions into a pressurized gas stream subsequently to creation of the fracture network, wherein the pressurized gas, in conjunction with the dry media, deposits the dry media in the fracture network, and wherein the pressurized gas has a sufficiently high gas to dry media ratio to maintain the soil formation in a state of dilation while the dry media is distributed throughout the fracture network, or otherwise to accommodate or promote the transport mechanism governing such distribution, or otherwise thereafter to utilize the fracture network by maintaining a continuous injection of the gas into it; including a) separate supply means for independently supplying the one or more dry media compositions, including valve means associated with each supply means which control the flow rate and amount of dry media composition from each supply means; b) pump means for introducing the dry media compositions under pressure into the above soil portion of the tubular probe means, coincidently with passage therethrough of the pressurized gas; and c) pressure regulating valve means between the pump means and the above soil portion of the tubular probe means to regulate and provide a sufficiently high gas to dry media ratio to maintain the soil formation in a state of dilation while the dry media is distributed throughout the fracture network, or otherwise accommodate or promote the transport mechanism governing such distribution.

The apparatus of the present invention further provides apparatus comprising nozzle means fluidly connecting the soil formation with the tubular probe means, and being a high velocity directional nozzle capable of delivering the pressurized gas to all or any significant circular section, i.e., arc of the surrounding soil formation, i.e., from about 15° to substantially 360°, the section being either defined and fixed, or else being determinable and selectable by operation of the nozzle, including a substantially planar nozzle whose injection aperture is a 360° opening of a predetermined height, and wherein the internal junction of the nozzle means with the tubular probe comprises a forcing cone having a uniform parabolic or functionally similar slope to provide maximum acceleration to the gas stream and dry media entrained therein immediately before entering the soil formation. Where the section of the soil formation to be injected with dry media is determinable and selectable by operation of the nozzle, there will be included with the nozzle as a part thereof, means for selecting the section to be injected with regard to its relative size. With regard to its direction relative to the soil formation, this is determined and selected based on markings on the well casing and tubular probe at the surface which correspond to the location of the section selector means on the directional nozzle.

Directional nozzle means may also be employed which are used in conjunction with the borehole casing itself. In this embodiment of the present invention the custom borehole casing includes injection ports located at predetermined intervals of depth and circumference through which the dry media can be injected by the tubular probe with directional nozzle means attached at the end thereof. The dry media injection port of the directional nozzle is brought into register with the injection port of the borehole casing, allowing the pressurized gas with entrained dry media to be injected directly into the soil formation. The injection ports in the borehole casing may be equipped with temporary plugs or with the protective closure means for dry media ports described in detail further below. These serve the function of preventing grit and other unwanted materials from the soil formation from entering the borehole. A substantially planar nozzle may be used in conjunction with the custom borehole casing as described herein, by replacing the directional nozzle with the planar nozzle. However, this would require that the injection ports in the custom borehole casing be virtually circumferential. Since this is virtually an impossibility, portions of the custom borehole casing sufficient to provide the required structural integrity must be allowed to remain. Sealing means must also be provided between the borehole casing and the tubular probe, above and below the dry media injection ports, in order to focus the force of the pressurized gas directly on the soil formation immediately in front of the ports.

Directional nozzle means may also be employed which are used in combination with a self-advancing borehole casing to form a single unit. Such nozzle means are equipped with jetting ports opening in a downward direction through which high velocity pressurized gas is ejected in order to cut through the soil formation to produce the borehole, which will typically be one characterized by low stability geologic conditions. These nozzles must also have protective closure means for blocking the dry media injection port(s) while the tubular probe is being advanced by drilling in order to prevent the entry of unwanted grit and other materials from the soil formation into the dry media ports while the drilling operation is being carried out. Without such means, these materials will block the dry media injection ports and seriously impair the functioning of the nozzle. This problem does not arise in the course of those drilling operations in which the borehole is first produced in a conventional manner and the tubular probe with nozzle means attached is later introduced into the completed borehole. The protective closure means for the dry media ports may be 1) of the trapdoor type which have a hinged or sliding movement which may be assisted by springloading, e.g., a retractable door means; 2) of the mitral valve type which employ a circular or parallel lateral arrangement of members which readily permit the movement of the pressurized gas in one direction while preventing the movement of grit and other materials from the soil formation in the opposite direction; and 3) of the one-way valve type which utilize a buoyant sphere movable within a cylindrical tube by either the pressurized gas in one direction or by the grit and other materials from the soil formation in the other direction, and are so configured that the buoyant sphere engages and seals a circular opening in one end of the cylindrical tube when moved in one direction, but is prevented from blocking the corresponding circular opening in the other end of the cylindrical tube and opposite direction, by a spacer element that permits the pressurized gas to flow around it. Whatever protective closure means and nozzle design are selected, they should be characterized by the smallest possible number of moving parts and should rely on the forces produced by the pressurized gas stream and by the soil formation for their operation, in order to provide a nozzle which is functional and reliable and not likely to result in significant down time for repair or replacement.

With regard to the substantially planar nozzle whose injection aperture is substantially a 360° opening, instead of being planar, i.e., at a 90° angle to the vertical tubular probe, the portion of the nozzle having the 360° aperture may slope upward and/or downward and thus have an angle of less than and/or greater than 90° with respect to the vertical tubular probe, from about 30° to about 80° and/or from about 100° to about 150°. Optionally, a sealing means above the aperture of the nozzle, and preferably below as well, is included to ensure that the injected gas stream is focused on a small area of the soil formation; the pressurized gas supply means includes compressor means for producing the pressurized gas; one or more holding tank means for holding a supply of the pressurized gas is provided; and valve means are used for connecting the holding means with the tubular supply means in order to provide a rush of the pressurized gas to the tubular probe means; means are utilized for exerting reduced pressure on the fracture network and adjacent soil formation in order to maintain a low volume flow of a pressurized gas through the fracture network; means for supplying the pressurized gas at a low volume flow are also provided, as well as optionally means for passively supplying air to the soil formation.

The apparatus of the present invention further provides the means described above wherein the tubular probe comprises two or more, especially four, pipes inserted into the ground as a single unit, and wherein any one of the nozzle means described herein is positioned in the sealed area in fluid communication with the tube means and the soil formation. This nozzle may be, e.g., a high velocity substantially planar nozzle whose injection aperture is a 360° opening of a predetermined height, and whose internal junction with the two or more pipes comprises a forcing cone having a uniform parabolic or functionally similar slope to provide maximum acceleration to the gas stream and dry media to be entrained therein when injected into the soil formation from each of the two or more pipes. By selecting the particular tube means into which the pressurized gas and/or entrained dry media is introduced, this embodiment permits the injection of two or more dry media compositions into the soil formation, either simultaneously or serially. Where this embodiment is used, other modifications of the apparatus of the present invention will be required. For example, there will be a need for additional supply means for each of the dry media compositions, as well as additional pump means and additional valve means.

In addition thereto, the apparatus of the present invention further provides adjustment means for permitting relative movement between the first and second packer means in response to soil movement during a soil formation fracturing operation; including means for slidably connecting the first and second packer means; and including wherein the means for slidably connecting includes a different diameter tube on which the second packer means is mounted, the different diameter tube being slidable with respect to the tube means, sealing means for sealing the tube means with the different diameter tube, a rod connected to the tube means and extending through the tube means and out of the different diameter tube, and spring means engaged between the rod and the different diameter tube for biasing the second packer means toward the first packer means while permitting relative movement therebetween.

The means for exerting reduced pressure on the fracture network is in particular a vacuum pump connected to one or more extraction wells. The optional means for supplying air comprise outlying wells which are vented to the atmosphere in order to provide passive air inlets to the fracture network and adjacent soil formation.

BRIEF DESCRIPTION OF THE DRAWINGS

FIG. 9 is a schematic cross-sectional side view representation of a borehole custom casing having a dry media injection ports at a predetermined interval both by depth and by circumference, with which a directional nozzle of the present invention is aligned. A temporary plug for another, unused dry media injection port in the borehole casing is also illustrated.

FIG. 10 is a front view of a borehole custom casing showing the dry media injection ports at predetermined intervals by depth and circumference, as well as portions of the concealed tubular probe therein.

FIG. 11a is a cross-sectional view of a self-advancing directional nozzle of the present invention illustrating the jetting ports and dry media injection ports therein, as well as a protective closure means therefor comprising a mitral valve in the open position.

FIG. 11b is a cross-sectional view of a self-advancing directional nozzle of the present invention illustrating the jetting ports and dry media injection ports therein, as well as a protective closure means therefor comprising a one-way valve in the open position.

DETAILED DESCRIPTION OF THE INVENTION

Figure 1:
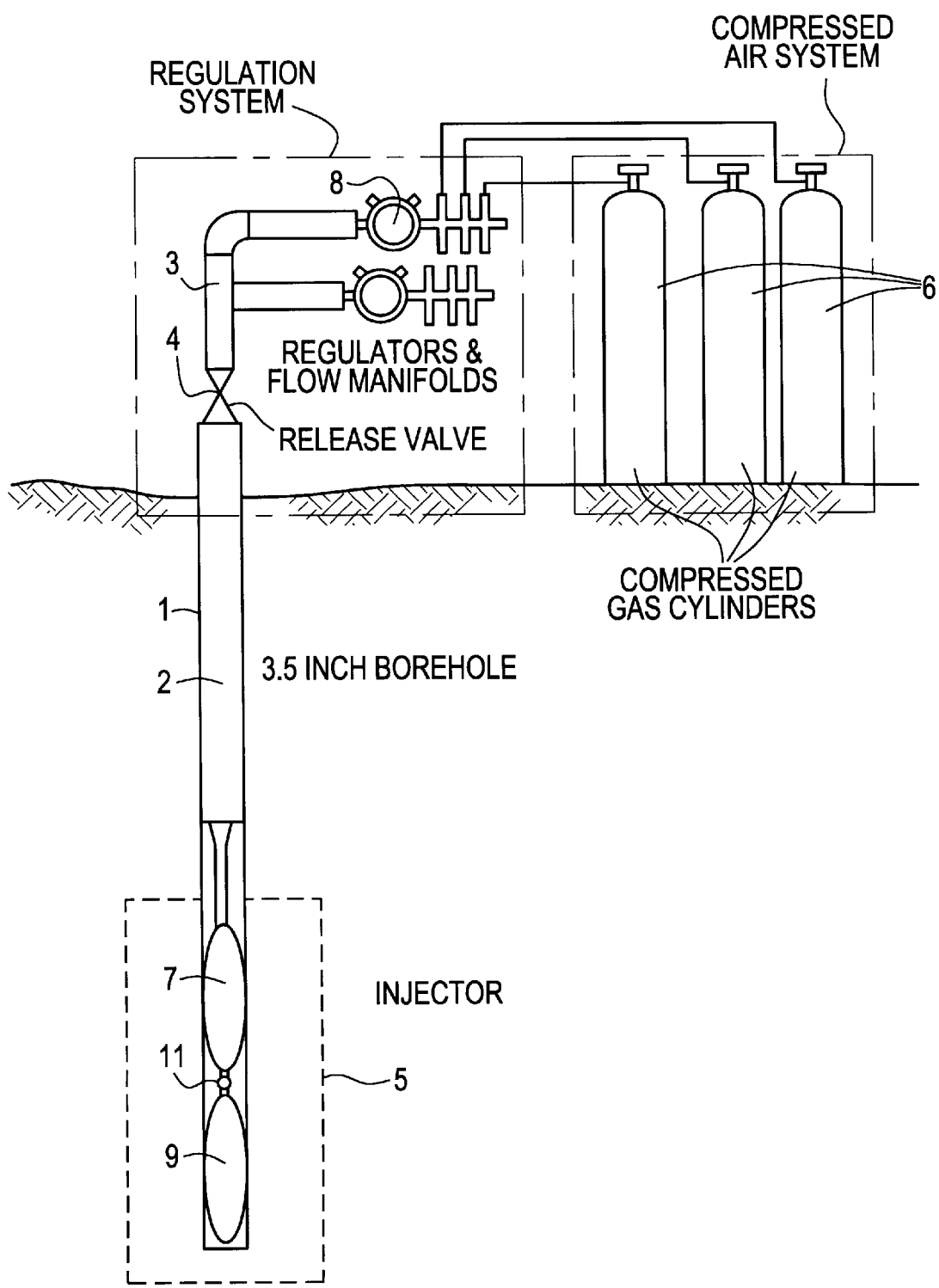
FIG. 1 is a schematic representation of the apparatus used to carry out the first step of pneumatic fracturing of the soil formation, into which one or more dry media compositions are later to be injected.

In its broadest scope, the present invention is contemplated to comprise a method and apparatus for pneumatically fracturing a soil formation, and thereafter utilizing or maintaining the fracture network thus formed by continuous injection of a gas stream thereinto, and introducing into that gas stream dry media which is entrained in the gas stream and thereby dispersed and distributed through the soil formation in predictable patterns. Accordingly, the first step of the method is the pneumatic fracturing during which a sudden gas surge, typically of compressed air, imparts energy to the soil.

The first step involves pneumatic fracturing of the soil formation to be treated, where an injector nozzle within a fracture well creates a series of fractures in the formation by the use of, e.g., high pressure and high flow rate compressed air. The second step involves pneumatically injecting one or more dry media compositions one or more times, usually on a periodic basis, into the soil formation being treated. The third step depends on the identity of the dry media composition which has been injected. For example, if it is a proppant such as sand, then the third step will involve conventional vapor extraction procedures and equipment, so that extraction wells with vacuum pumps, and venting well for supplying additional air, will be required. If, on the other hand, the dry media composition comprises nutritive ingredients for the operation of an in situ biodegradation cell, then the fracture well will be converted to a low flow extraction well by means of a vacuum.

Pneumatic Fracturing

Pneumatic fracturing injects air and/or other gases into a soil formation at high pressures and high flow rates in order to create cracks or fractures in the soil formation. The air or other gas, which as a practical matter must be used in compressed form, is injected into the soil formation at a pressure that exceeds the in situ stresses that are present in the soil formation. The burst of air or other gas cracks the formation and creates horizontal fracture planes which extend out radially from the point of injection. For example, when compressed air is injected into an isolated section of a borehole in accordance with procedures described hereafter, the geologic formation involved will become stressed and eventually will fail when the breakdown pressure is reached. Upon failure, fractures will propagate perpendicular to the least principal stress in the formation, i.e., the air will take the path of least resistance. Low permeability soils tend to be over-consolidated, with the result that the least principal stress is in the vertical direction. Consequently, fractures will tend to extend horizontally from the injection point. Frequently, however, as the artisan is well aware, subsurface geological formations are not parallel to the earth's surface, but are at an angle thereto do to the action of plate tectonics, which have caused uplifting and tilting of such formations, with reference to the normal plane of the earth's surface. The pneumatic fracturing process greatly increases both the permeability and the exposed surface area of the soil formation, thus allowing greater access to the areas of contamination.

High initiation pressures are not required to initiate shallow fractures, since fracture initiation pressures at depths of less than 20 feet are less than 200 psi for rock formations, and 100 psi for soil formations. A more important factor than the injection pressure is the injection flow rate. The greater the volume of air or other gas per unit of time injected into the soil formation, the further the resulting fracture will propagate, since the fracture initiation pressure is maintained over a greater area of the soil. Accordingly, it is necessary for the pneumatic fracturing system to deliver the air or other gas not only at high pressures, but also at high flow rates. Where these criteria are satisfied, it is possible to attain fracture radii in excess of 25 feet. These pressure and flow rate requirements can usually be met most economically by the use of air compressors of the type which are well known and readily available.

Since the present invention involves the pneumatic injection of dry media compositions into a soil formation, as well as the pneumatic fracturing of that soil formation in preparation for such dry media delivery, an important criterion for successful application of the method of the present invention is strict control of the pressures and flow rates of both the main, or fracturing and dilating, air or gas injection system, as well as the auxiliary dry media injection system. An inverse relationship is maintained between the flow rates of these two systems which together comprise the method of the present invention. As the injection of the dry media composition(s) is initiated, the amount of injected air is slowly decreased, thus maintaining approximately the same original total air flow. Thus, an important, if not essential, feature of the auxiliary media injection system is its ability to efficiently disperse the dry media in the entraining gas stream. This is preferably done by direct pressure feed, which assures that the dry media composition(s) will fluidize prior to entering the main air or gas stream. The source of the pressure feed for the dry media composition(s) is either an independent air or gas source, or a parallel by-pass tap of the main injection air flow.

Pneumatic Fracturing Apparatus

Typically, apparatus used to carry out the step of pneumatic fracturing, portions of which are depicted in FIG. 1 and the other figures of the drawings, includes a tubular probe having a soil penetrating portion 1 in fluid communication with an above soil portion 3. A double packer assembly 5 is connected to the lower end of the soil penetrating portion and includes an upper, elastic balloon-type packer 7 connected in surrounding relation to the soil penetrating portion, and a lower, elastic balloon-type packer 9 connected in surrounding relation to the soil penetrating portion and in spaced relation to the upper packer. When the soil penetrating portion is placed within a larger diameter well, and the packers are inflated, they tightly engage the walls of the well so as to create a sealed area between the packers in the well. A nozzle portion 11 is formed as part of the soil penetrating portion, between the packers.

It has been found that the methods of the present invention can be carried out with a higher degree of proficiency and a greater degree of success by employing therein the novel high velocity directional or substantially planar nozzles of the present invention. These nozzles are capable of delivering the pressurized gas to all or any significant circular section, i.e., an injection arc of the surrounding soil formation, i.e., from about 15° to substantially 360°, the section being either defined and fixed, or else being determinable and selectable by operation of the nozzle, including a substantially planar nozzle whose injection aperture is a 360° opening of a predetermined height. While the directional nozzles are suitable for certain applications, and the substantially planar nozzles are suitable for other applications, as described in more detail further below, overall, the directional nozzles are the preferred embodiments of the present invention. The nozzles of the present invention are also characterized by the fact that the internal junction of the nozzle means with the tubular probe means comprises a forcing cone having a uniform parabolic or functionally similar slope to provide maximum acceleration to the gas stream and its entrained dry media immediately before entry into the soil formation.

Substantially Planar Nozzles

Figure 3:
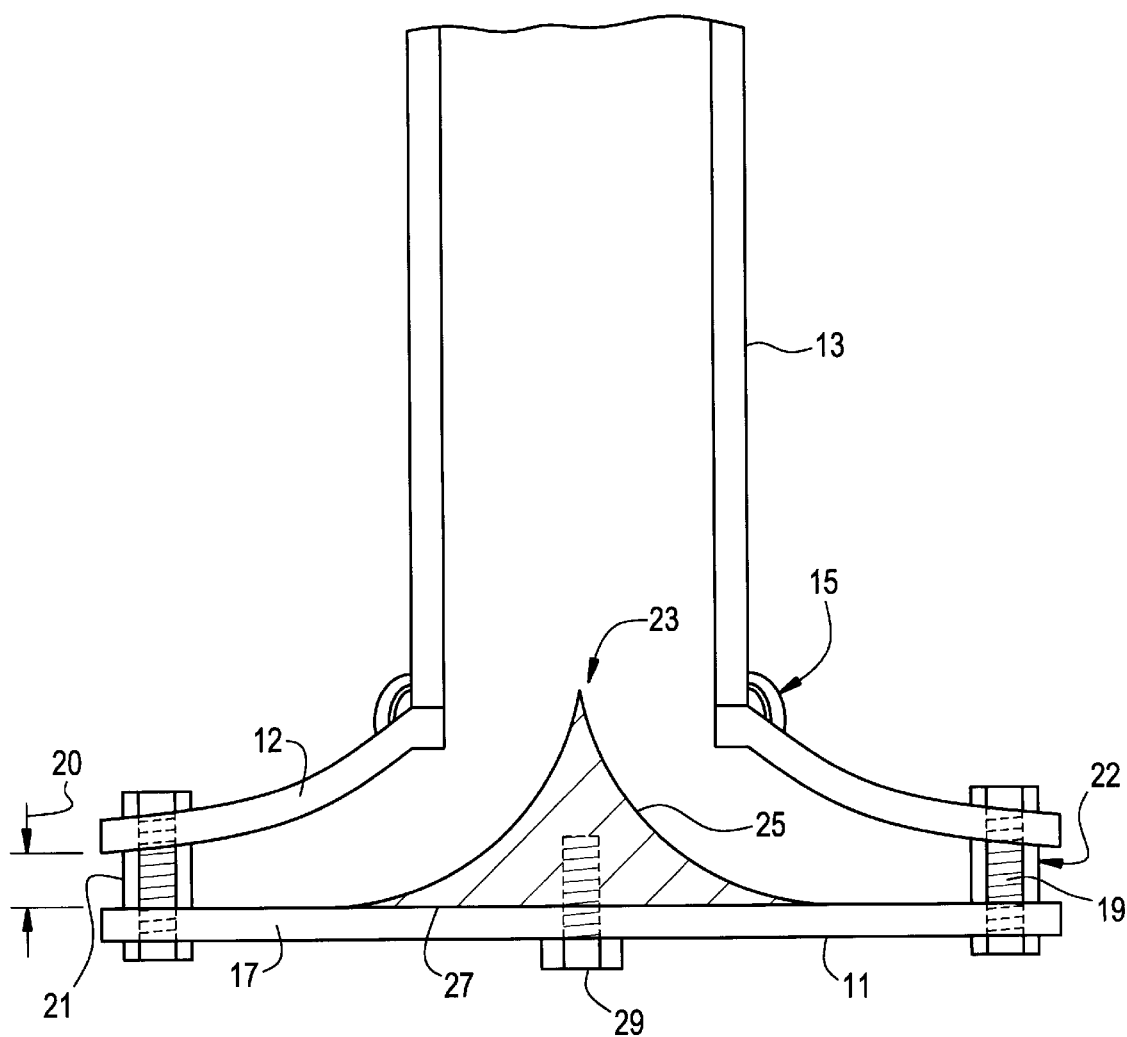
FIG. 3 is a schematic cross-sectional representation of the nozzle of FIG. 2 showing additional detail such as the internal forcing cone with its uniform parabolic sloping sides, the bolts which anchor the bottom plate, and permit adjustment of the height of the 360° aperture, and the fillet weld by means of which the nozzle is attached to the tubular probe.

The substantially planar nozzle of the present invention is a plate-type nozzle which directs the injection stream horizontally into the formation in a very narrow plane, and then cuts or intrudes the geologic medium of the soil formation instantaneously upon continuous introduction of the pressurized gas stream. The nozzle also functions to accelerate the gas to a higher velocity than it has in the tubular probe, thus improving the ability of the gas stream to entrain, i.e., transport and maintain in a suspended, i.e., dispersed condition, the dry media compositions which are introduced therein. As shown in FIG. 3, the nozzle 11 is attached by means of a sloping top portion 12 to the tubular probe 13 by the welding fillets 15, and additionally includes the bottom plate 17 attached to the sloping top portion 12 by means of the bolts 19. The distance 20 between the sloping top portion 12 and the bottom plate 17 defines the aperture 21, and is maintained by the spacers 22, and is variable, depending on the height of the spacers. The aperture 21 comprises a substantially 360° opening, i.e., it occupies the entire circumference of the nozzle 11, except for the bolts 19 and spacers 22, of which there are preferably only four, thus permitting injection through the nozzle 11 into all four quadrants of the compass, i.e., the whole circumference of the surrounding soil formation in the well. In the inside center of the nozzle 11 is the forcing cone 23, which has uniform parabolically sloping walls 25, and has its larger base 27 connected in sealing relation to the bottom plate 17 by the bolt 29. Thus positioned, the sloping walls of the nozzle cone direct the pressurized gas stream out through the aperture 21 and into the surrounding soil formation. The substantially 360° aperture 21 propagates fractures in all directions simultaneously, and has been found to be especially suitable for formations with low to moderate permeability.

Figure 5:
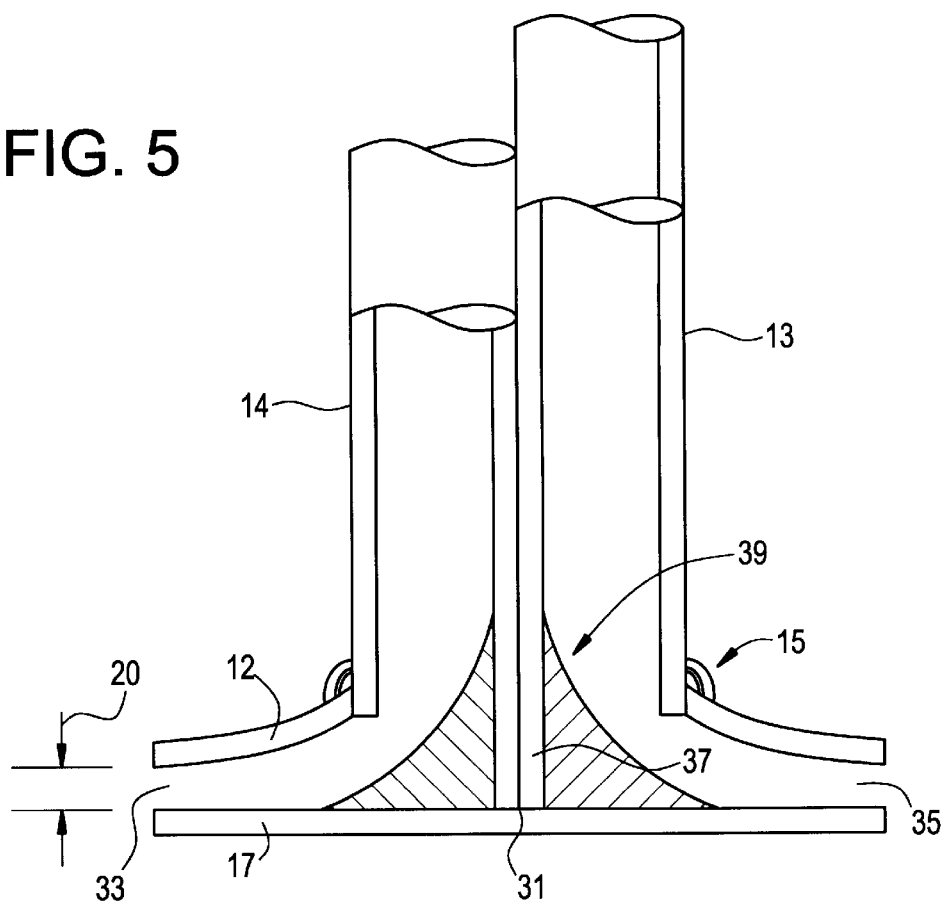
FIG. 5 is a schematic cross-sectional side view representation of a tubular probe comprising four pipes inserted into the ground as a single unit, to which a directional plate nozzle is attached below ground, with the internal forcing cone comprising four quadrant ramps, one for each pipe.
Figure 6:
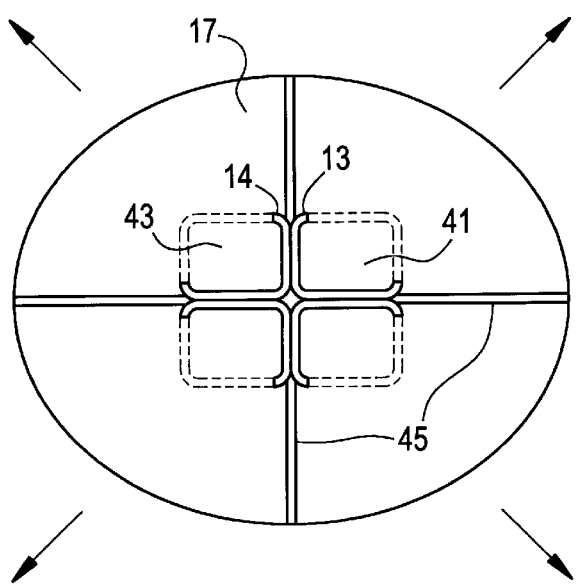
FIG. 6 is a schematic cross-sectional top view representation of a tubular probe comprising four square pipes inserted into the ground as a single unit, to which a directional plate nozzle is attached, only the bottom plate of which is shown, and including directional baffles for focusing the gas injection stream from each pipe in a specific direction.

A variation of the substantially planar nozzle 11 described above, is shown in FIG. 5 and FIG. 6 for an embodiment of the present invention which can be used for simultaneous or sequential pneumatic injection of more than one dry media composition. In the embodiment shown, the tubular probe comprises four square pipes are joined together, although only two of these, 13 and 14, are shown in cross-section in FIG. 5. The top portion 12 is welded by fillets 15 to these pipes, while bottom plate 17 is welded to the junction of the four pipes 31, with the distance 20 between the top portion 12 and the bottom plate 17 defining the aperture 33, which is not, strictly speaking, a 360° aperture, because there is a corresponding aperture 35 slightly separated from it by the intervening pipe sections 37. In order to accomplish the same acceleration of the gas stream that was achieved with nozzle 11 using the forcing cone 23, there is employed in this embodiment a forcing ramp 39 in each pipe section. Some of the aspects of this embodiment appear more clearly from the top cross-sectional view in FIG. 6, where pipes 13 and 14 are shown atop bottom plate 17, with their cutaway portions indicated at 41 and 43, respectively. The optional use of baffles is also illustrated at 45.

Sealing Means During Fracturing

Returning to FIG. 1, the above soil portion 3 of tubular probe 2 is connected through a quick release valve 4 to a holding or receiving tank 6 having a pressure gauge 8 associated therewith in order to measure the pressure within the holding tank. The holding tank, which can be a single tank, or a series of tanks 6 connected in series or parallel, in turn is connected to a compressor through a high pressure hose and air purification unit (not shown).

In operation, after the drill rig drills a well, the soil penetrating portion with the double packer assembly is inserted down the well to a first height. The air compressor then supplies pressurized air through the pressure hose and when the pressure within the holding tank(s) reaches a predetermined pressure, the quick release valve is opened to provide a sudden rush of pressurized air down the soil penetrating portion of the tubular probe. The sudden rush of pressurized air produces a first fractured soil formation. Thereafter, the double packer assembly and soil penetrating portion are inserted to a further depth and the operation is repeated to provide a second fractured soil formation, and so on. In many instances, after the soil formation has been fractured, the soil will move. If the packers are fixed relative to each other, undue stress on the packer assembly may result. Thus, in a preferred embodiment, a second packer is movable in the axial direction with respect to a first packer. Specifically, the second packer is mounted to a smaller diameter tube, which is slidable within the nozzle portion. An O-ring seal or the like is provided therebetween to ensure a sealed arrangement. An annular flange is provided in surrounding relation to the smaller diameter tube near the upper end and normally abuts against the lower end of the nozzle portion to provide an additional seal prior to performing the fracturing operation. A rod extends through the smaller diameter tube, the nozzle portion and soil penetrating portion, and is fled within the soil penetrating portion by a spider assembly or the like. The opposite end of the rod extending from the smaller diameter tube has a circular stop secured thereto, and a helical coil spring extends about the rod and is restrained between the stop and the lower end of the smaller diameter tube, so as to normally bias the smaller diameter tube, and thereby the second packer, toward the first packer. Upon fracturing of the soil by the sudden burst of air, the earth will separate, and accordingly, the second packer will move with the earth apart from the first packer to maintain the sealed arrangement and to prevent damage to double packer assembly.

Figure 2:
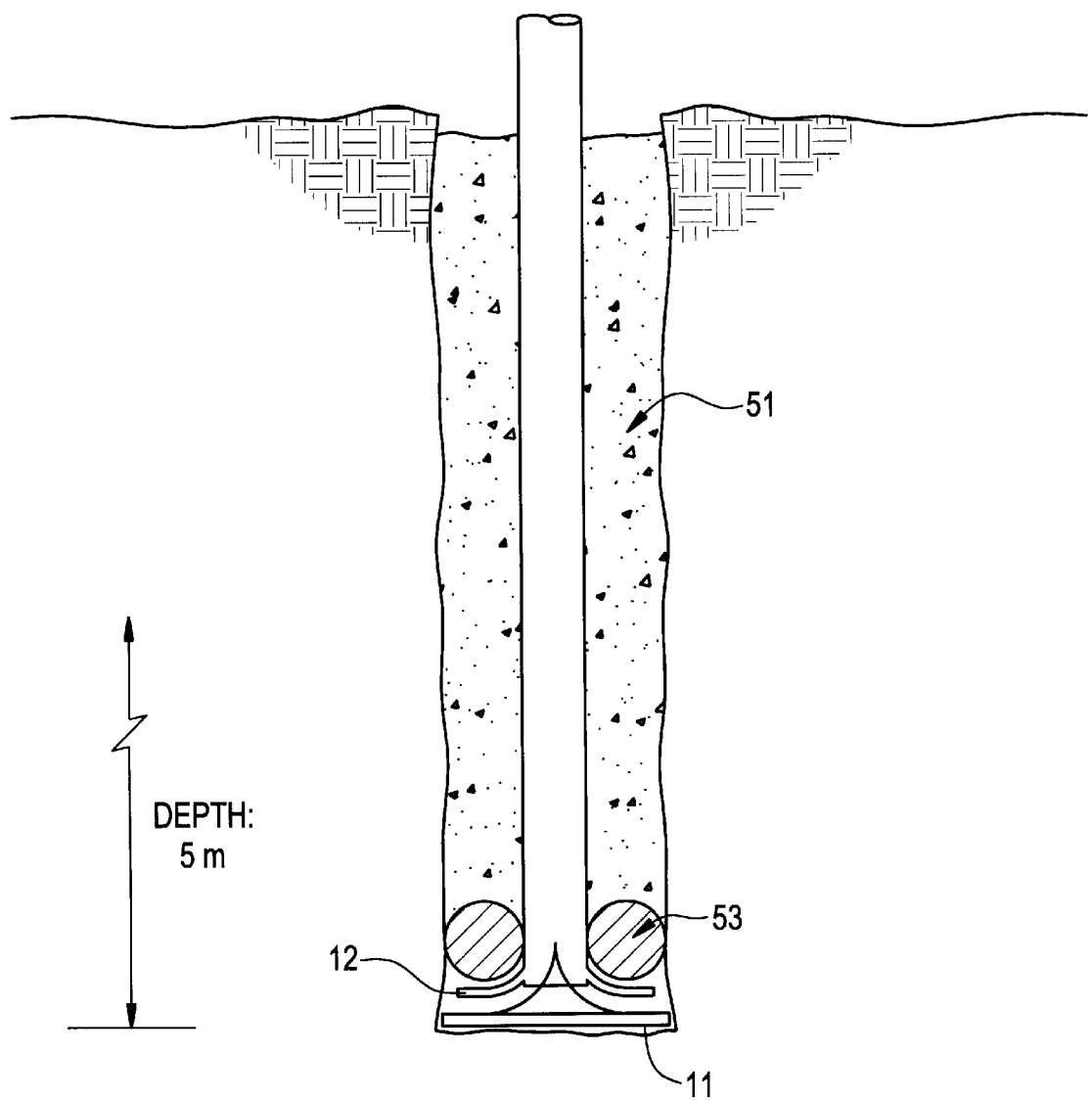
FIG. 2 is a schematic cross-sectional representation of a portion of the below ground apparatus of the present invention for pneumatic fracturing of a soil formation and pneumatic injection of dry media therein, including a high velocity nozzle of the present invention, and a sealing means above the aperture of the nozzle to ensure that the injected gas stream is focused on a small area of the soil formation.
Figure 7:
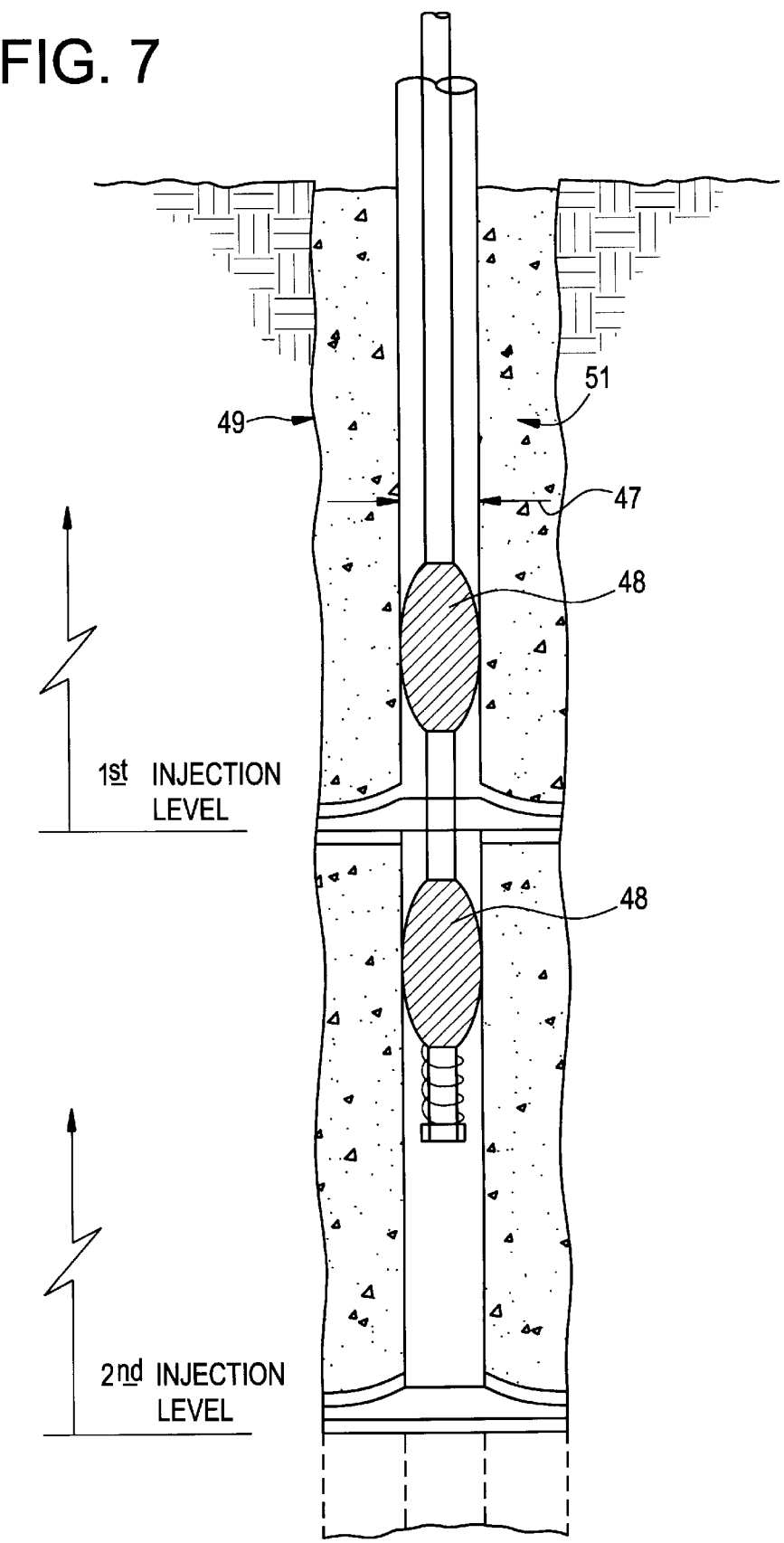
FIG. 7 is a schematic cross-sectional side view representation of a typical injection well where the tubular probe has first and second packer means connected thereto for pressing against the walls of the casing so as to provide a sealed area in the casing between the first and second packer means for the purpose of focusing the pneumatic injection stream against several succeeding specific portions of the soil formation.

While the packer assembly described above is a preferred embodiment of the present invention, other embodiments have been found suitable and are still more preferred. For example, in FIG. 7 there is shown a double packer assembly 48 used within a well casing 47 to fracture a soil formation at more than one location. Since the assembly 48 is contained within a well casing 47, and the borehole 49 is grouted 51 to its full depth, the danger of damage to the packer assembly described above is no longer present, and consequently, the features permitting the packers to be slidably movable with respect to each other are no longer needed. An additional feature which may be employed with, or even instead of the packer assembly in a well casing where the borehole is fully grouted, is shown in FIG. 2, where a "doughnut" seal 53, made from a suitable material, is placed above the top portion 12 of the nozzle 11. The doughnut seal prevents the borehole grouting 51 from coming in contact with the top portion 12 of the nozzle 11, where it might otherwise adhere to, or even block the aperture of, the nozzle 11. The doughnut seal also helps assure that the injected gas stream goes directly into the surrounding soil formation, instead of being diverted up the borehole 49. Thus, the doughnut seal 53 duplicates to some-extent the function of the packer assembly.

Dry Media Injection Apparatus

Figure 4:
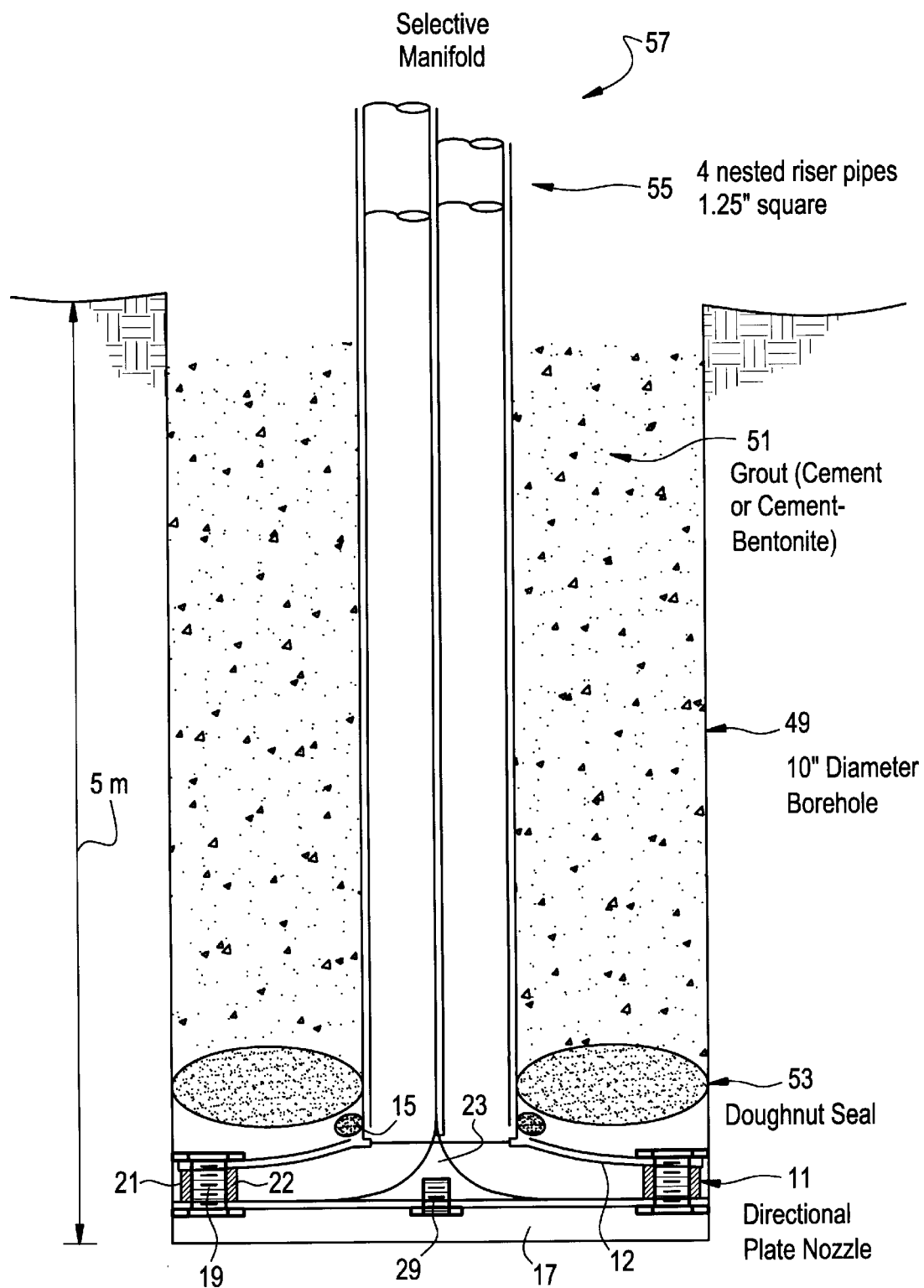
FIG. 4 is a schematic cross-sectional representation of a tubular probe comprising four pipes inserted into the ground as a single unit, to which a selective manifold is fluidly connected above ground, and to which a directional plate nozzle is attached below ground, with its internal forcing cone positioned with its peak directly below the center junction of the four pipes.

The various apparatus features described above may also be used in the context of the embodiments of the present invention which relate to the use of a tubular probe for delivering more than one dry media composition. The below ground portions of such a multi-pipe embodiment are schematically illustrated in FIG. 4, where four (4) nested riser pipes 55 are placed in a borehole 49 which has been filled with grout 51. The riser pipes 55 terminate in the directional plate nozzle 11, to which they are attached by weld fillets 15. The doughnut seal 53 is positioned above the top plate 12 of nozzle 11, where it performs the same function as with a single tubular probe. The bottom plate 17 of nozzle 11 is attached to the top plate 12 by bolts 19, which have spacers 22 so that the opening of aperture 21 can be varied. In this embodiment, nozzle 11 has a forcing cone 23 attached to bottom plate 17 by bolt 29, instead of forcing ramps and optional baffles, as described in another embodiment further above. Since this embodiment is intended to deliver more than one dry media composition, there is also shown, for the above ground portion associated with it, a selective manifold 57, which functions to selectively-deliver, either simultaneously or sequentially, to any one or more of the riser pipes 55, a predetermined amount of two or more, or any combination of several, dry media compositions. Further details concerning such a selective manifold are set out further below.

The nozzles used in the present invention are also important for maintaining the dry media in suspension, since it accelerates the air or gas stream to a higher velocity, which improves its ability to suspend or entrain the solid particles. The 360° nozzle propagates fractures in all directions simultaneously, and is suitable for formations with low to moderate permeability. The nozzle having four quadrants, optionally with forcing ramps, divides the total injection flow into one or more of four quadrants, thereby permitting the operator to focus the injection energy over a smaller arc radius of the surrounding soil formation. This embodiment of the nozzle is useful in very coarse grained formations with a high permeability, since it focuses the injection energy in a specific direction. It can be operated by successively injecting into each quadrant, resulting in four separate fracture lobes which merge to form a planar fracture or void. In other embodiments of this "quad" nozzle, two or three, or even five or more riser pipes are utilized, and the corresponding 360° nozzle portion is divided into two, three, five and more sections, respectively. The injection nozzles are either grouted into the borehole if discrete levels are to be fractured, or they may be mounted on a straddle packer assembly as described elsewhere herein. This "quad" nozzle could also be used if it were desirable to fracture the soil formation in a specific direction only, which would convert this otherwise substantially planar nozzle into a directional nozzle, i.e., one useful for focusing the pressurized gas stream and the dry media entrained therein onto an injection arc comprising some fraction of the 360° circle of surrounding soil formation. However, where it is desirable to use a directional nozzle, other more preferred embodiments of the present invention, described further below, would be used in preference to the "quad" nozzle.

Angular Nozzles

Figure 17:
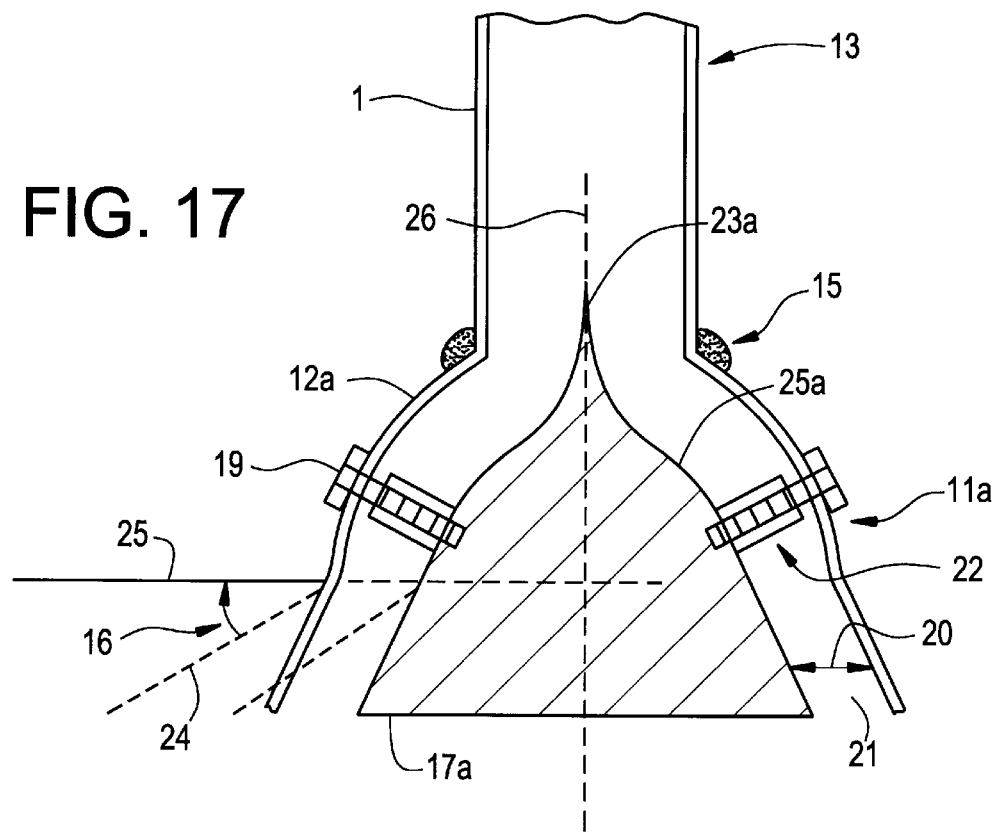
FIG. 17 is a schematic cross-sectional view of a nozzle embodiment of the present invention which has substantially a 360° aperture, and in which flow of the pressurized gas stream is directed downward.
Figure 18:
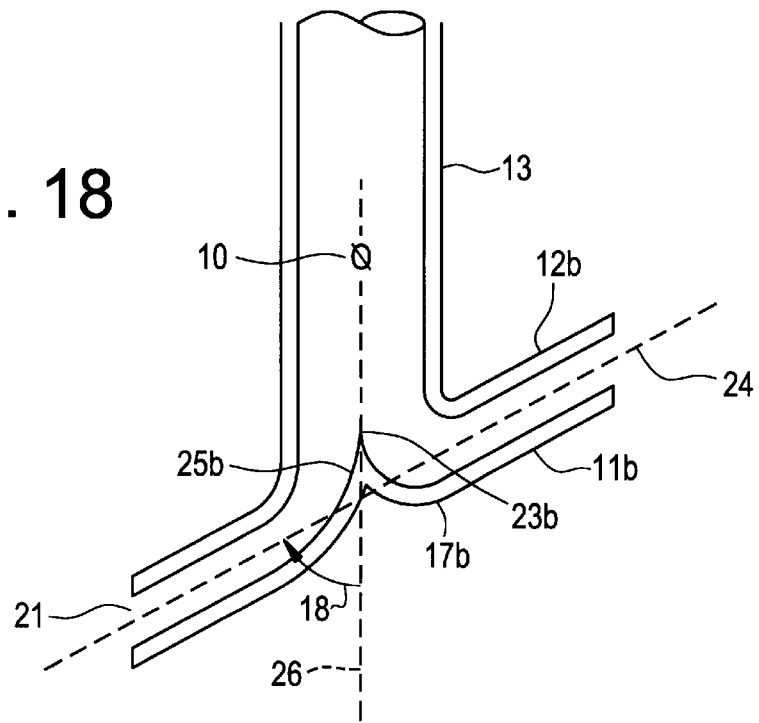
FIG. 18 is a schematic cross-sectional view of a nozzle embodiment of the present invention which has a 360° aperture, but in which the plane of the aperture is inclined from the perpendicular with respect to the axis of the tubular probe.

As has already been adverted to further above, subsurface geological formations are frequently not parallel to the earth's surface, but are at an angle thereto as a result of the action of plate tectonics, which cause uplifting and tilting in such formations. Accordingly, where such formations have been determined to exist, the efficiency of the nozzles of the present invention can be improved by changing the angle of the plane of the aperture to the axis of the tubular probe. This modification allows the flow of the pressurized gas stream leaving the aperture of the nozzle to be directed in the same plane as the soil formation substratum. Where the plane of the soil formation substratum is parallel to the earth's surface, the substantially planar nozzle disposed at an angle of 90° to the tubular probe will be used.

Where the plane of the soil formation substratum is perpendicular or nearly perpendicular to the plane of the earth's surface, the nozzle shown in FIG. 17 may also be used, since the direction of the nozzle can be easily modified. This nozzle can also be used as a replacement for the substantially planar nozzle where the plane of the soil formation is parallel to the plane of the earth's surface, but where there is some concern that using the substantially planar nozzle described above will cause too much disruption in the soil formation immediately adjacent the nozzle and thereby reduce its efficiency. The soil penetrating portion 1 of tubular probe 13 has nozzle 11a attached thereto by means of fillet welds 15, with sloping top portion 12a, which together with bottom plate 17a defines aperture 21, comprising a substantially 360° opening. The bottom plate 17a is attached to sloping top plate 12a by bolts 19, which have spacers 22 so that the diameter of opening 20 of aperture 21 can be varied. Within nozzle 11a is forcing cone 23a, which together with parabolically or functionally similar sloping walls 25a direct the pressurized gas stream out through aperture 21 and into the surrounding soil formation at an angle calculated to be in approximately the same plane as the plane of the soil formation substratum. This angle, indicated as 16, is the angle between the plane of nozzle 11a through aperture 21, shown as 24 for a nozzle in a slightly different plane, and a plane 25 perpendicular to axis 26 of tubular probe. The parabolic or functionally similar slope of the nozzle walls serves to increase the speed of the pressurized gas stream as it travels through nozzle 11a. This, together with angle 16 of a nozzle in a slightly different plane from nozzle 11a, will maximize the effect of said gas stream and any dry media entrained therein.

Where the plane of the soil formation substratum is neither parallel nor perpendicular to the plane of the earth's surface, but is at some angle thereto, a nozzle such as the one shown in FIG. 18 may be used. Tubular probe 13 has nozzle 11b attached thereto, with sloping top portion 12b, which together with corresponding bottom portion 17b defines aperture 21, comprising a substantially 360° opening. Within nozzle 11b is forcing cone 23b, which together with parabolically or functionally similar sloping walls 25b direct the pressurized gas stream out through aperture 21 and into the surrounding soil formation at an angle calculated to be in approximately the same plane as the plane of the soil formation substratum. This angle, indicated as 18, is the angle between the plane of nozzle 11b through aperture 21, shown as 24, and axis 26 of tubular probe 13. The parabolic or functionally similar slope of the nozzle walls serves to increase the speed of the pressurized gas stream as it travels through nozzle 11b. This, together with angle 18 of nozzle 11b, will maximize the effect of said gas stream and any dry media entrained therein. The presence of angle 18 in the design of nozzle 11b may induce more of the gas stream to pass to one side thereof than the other, due to gravitational effects. This tendency may be compensated for by the use of an adjustable baffle 10, which directs the flow of the pressurized gas stream.

The artisan will appreciate that angles 16 and 18, and especially 18, may be varied over a considerable range, depending upon and corresponding to the angle between the plane of the soil formation substratum and the plane of the earth's surface. This may be accomplished by the use of nozzles having fixed angles, such as those shown in FIGS. 17 and 18, or it may be accomplished by the use of a nozzle having adjustable angles (not shown). The artisan will also be aware that it is not necessary to conform the angle of the nozzle exactly to the angle of the plane of the soil formation substratum, although the closer this angle is approximated, the more optimum will be the results. The artisan will be still further aware that the dimensions and other aspects of the nozzles of the present invention may be varied depending upon such factors as the width of the bore hole and of tubular probe 13. The width of aperture 21 may be varied depending upon the desired volume and velocity of the pressurized gas stream passing therethrough, and the character and amount of any dry media which may be entrained therein.

Nozzle and Borehole Casing Combined Use

Planar Nozzles

Figure 8:
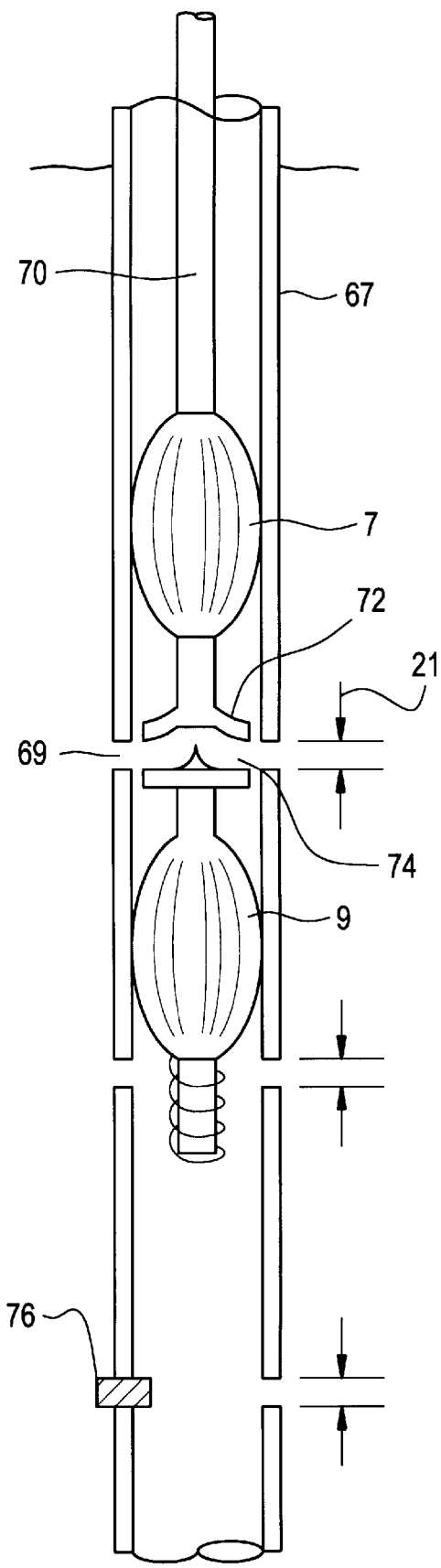
FIG. 8 is a schematic cross-sectional side view representation of a borehole custom casing having dry media injection ports at predetermined depth intervals, with which a substantially planar 360° dry media injection nozzle of the present invention is aligned.
Figure 11:
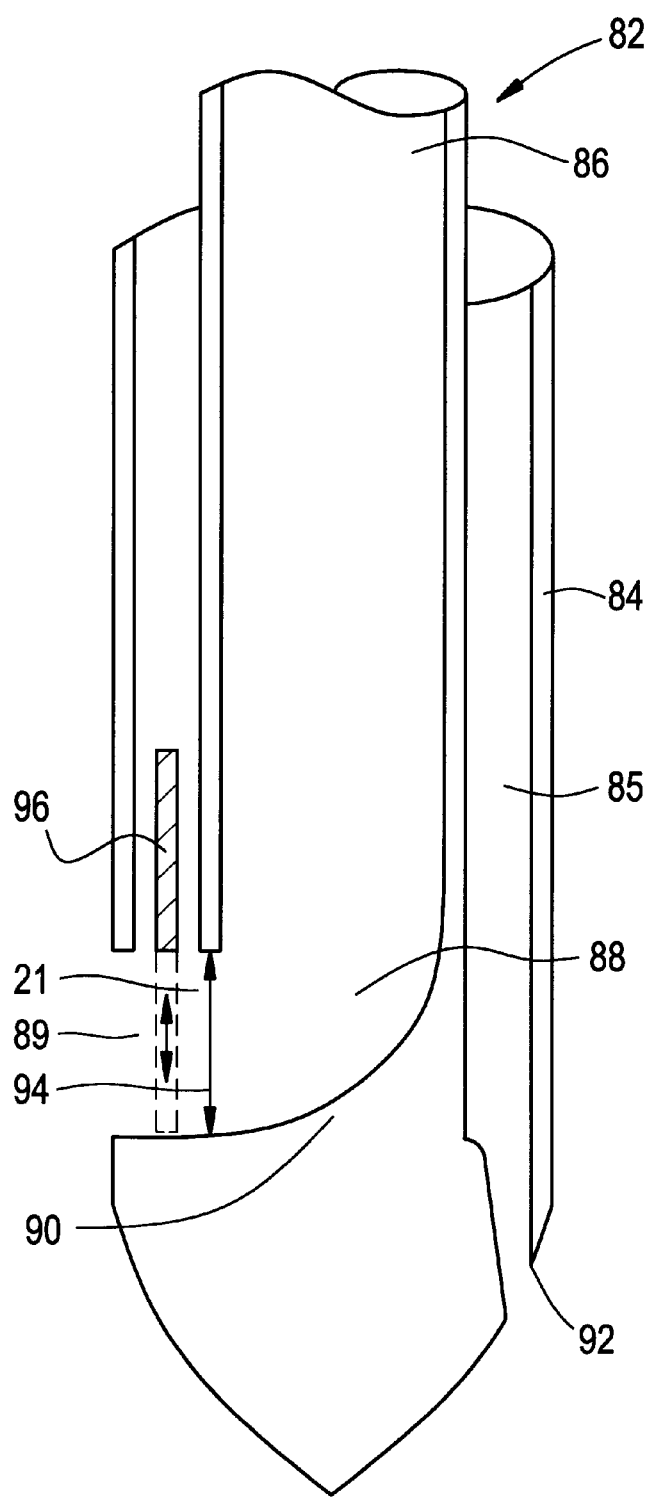
FIG. 11 is a cross-sectional view of a self-advancing directional nozzle of the present invention illustrating the jetting ports and dry media injection ports therein, as well as a protective closure means therefor comprising a retractable shutter in the retracted or open position.
Figure 12:
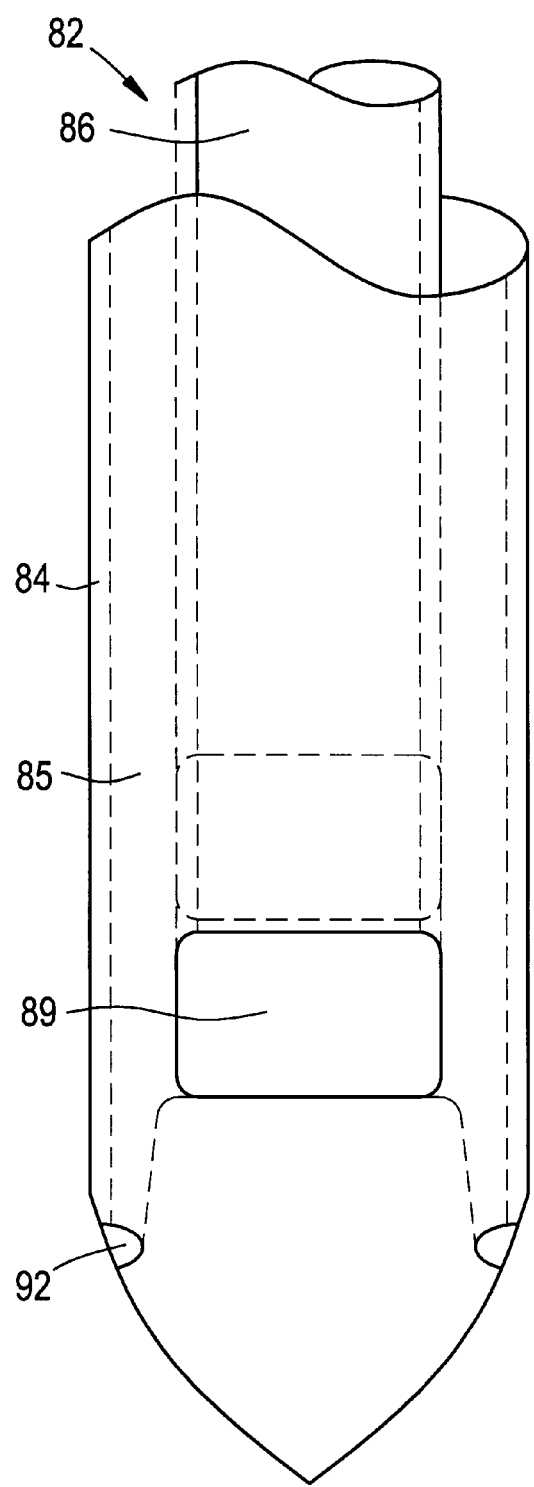
FIG. 12 is a front view of a self-advancing directional nozzle of the present invention illustrating the jetting ports and dry media injection ports therein, as well as portions of the concealed tubular probe therein.
Figure 13:
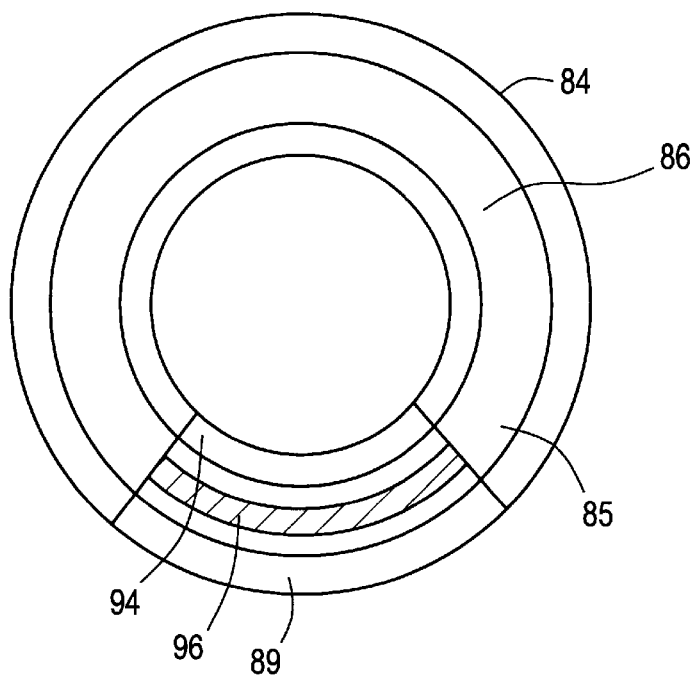
FIG. 13 is a cross-sectional top view of the self-advancing directional nozzle of FIG. 11 illustrating the annulus for the jetting ports, the jetting ports and dry media injection ports therein, as well as the protective closure means therefor comprising a retractable shutter.
Figure 14:
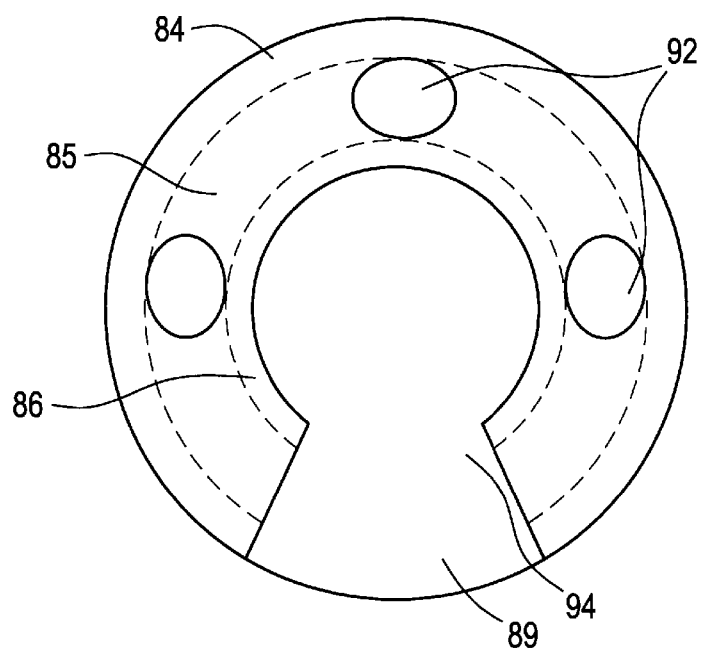
FIG. 14 is a cross-sectional top view of the self-advancing directional nozzle of FIG. 12 illustrating the jetting ports and dry media injection port, as well as the protective closure means therefor comprising a retractable shutter in the retracted position.
Figure 15:
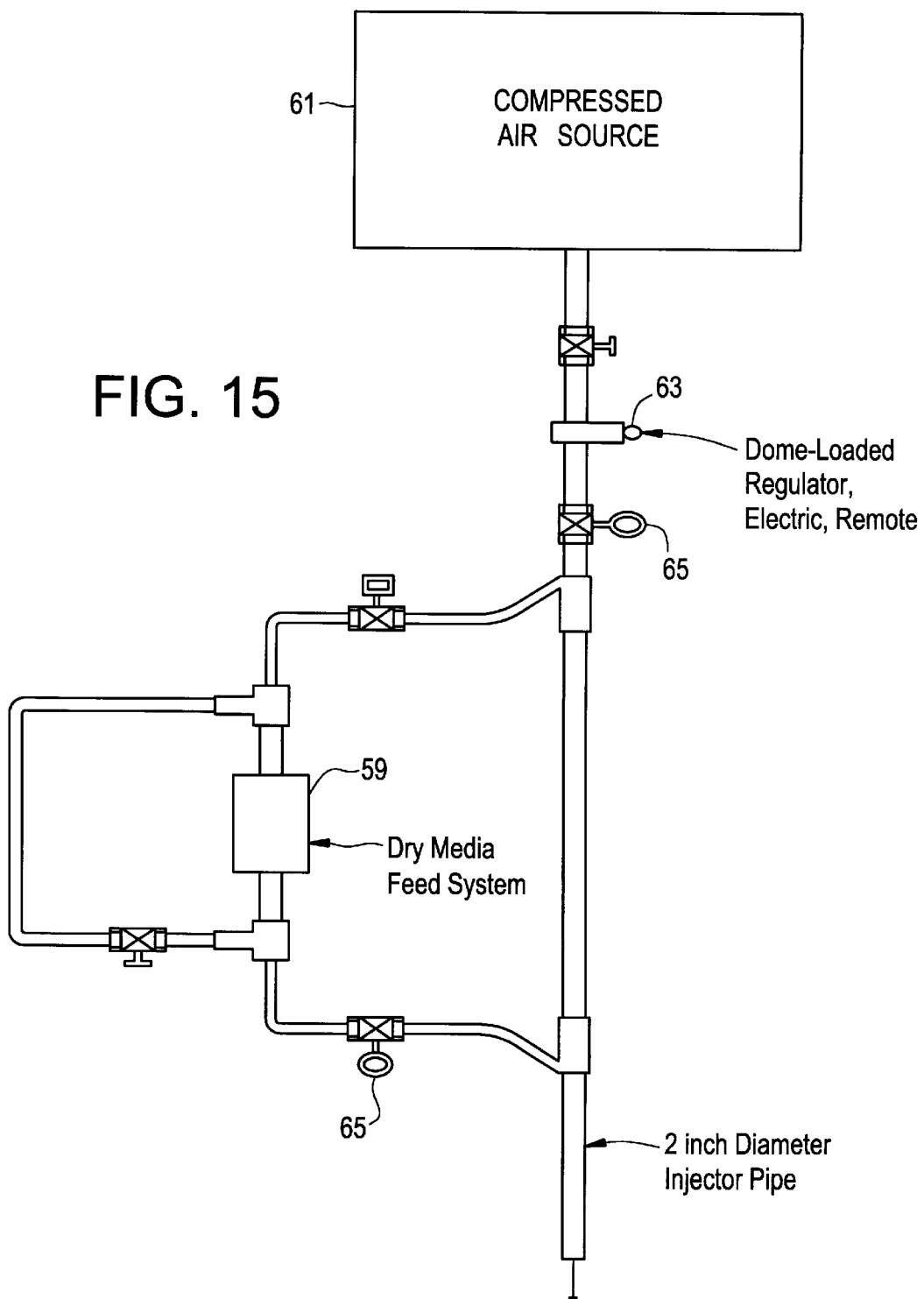
FIG. 15 is a schematic representation of the above-ground portion of a full-scale in situ vitrification system of the present invention which employs a graphite feed of the sand blast type.
Figure 16:
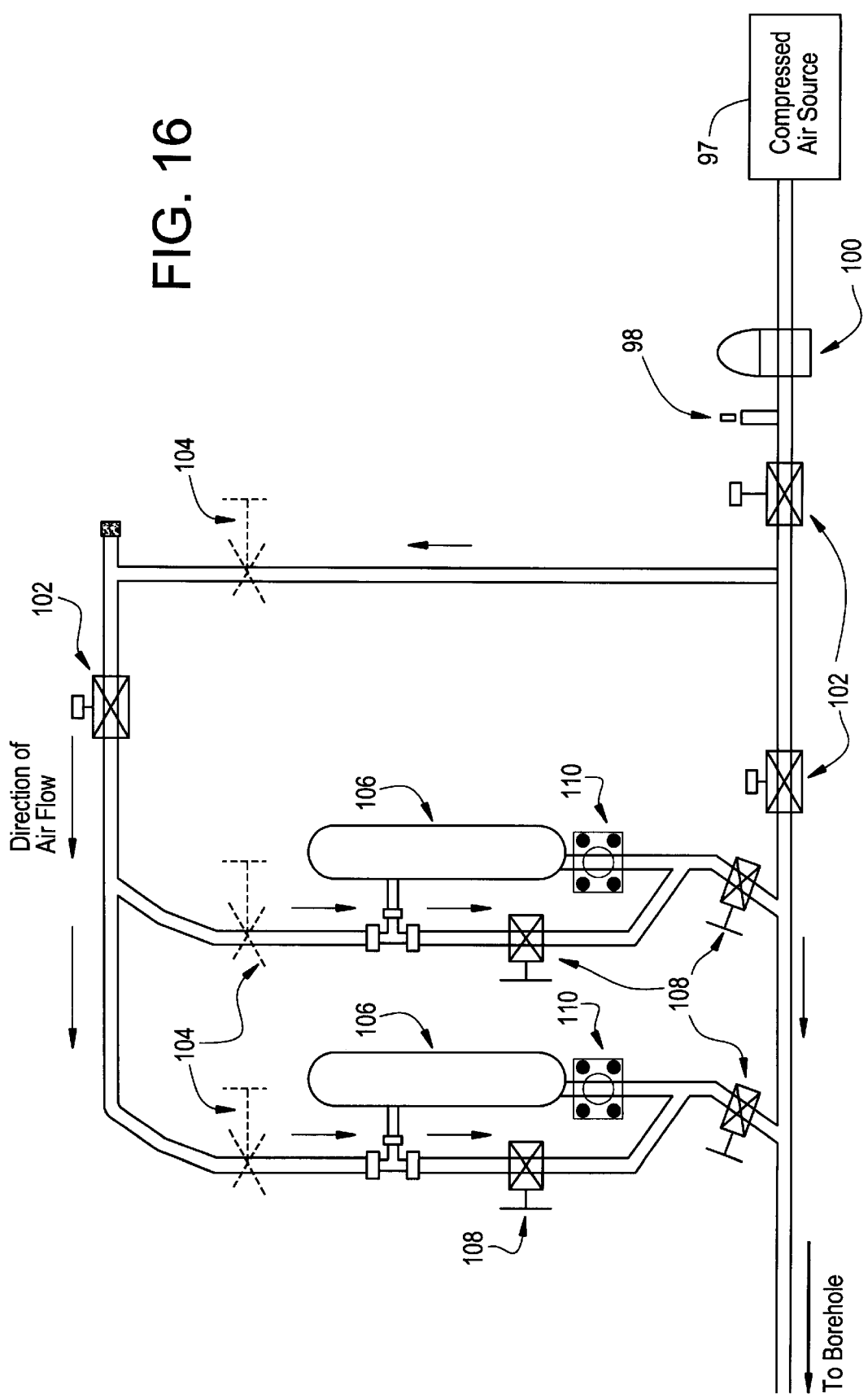
FIG. 16 is a schematic representation of the above-ground portion of a full-scale apparatus of the present invention for pneumatic fracturing and dry media injection, including two dry media holding tanks together with the piping and valve means necessary for their operation.

Substantially planar nozzles and directional nozzle means of the present invention may also be employed in conjunction with the borehole casing itself, as shown in FIGS. 8, 9, 10. In the embodiment of the present invention shown in FIG. 8, custom borehole casing 67 includes injection ports 69 located at predetermined intervals of depth and circumference through which the dry media can be injected by tubular probe 70 with substantially planar nozzle means 72 attached at the end thereof. Dry media injection ports 74 of substantially planar nozzle 72, having aperture 21 with the indicated height, is brought into register with injection port 69 of custom borehole casing 67, allowing the pressurized gas with entrained dry media to be injected directly into the soil formation. Injection ports 69 in custom borehole casing 67 may be equipped with temporary plugs 76 or with the protective closure means for dry media ports described in detail further below. These serve the function of preventing grit and other unwanted materials from the soil formation from entering the borehole. Sealing means must also be provided between custom borehole casing 67 and tubular probe 70, above and below dry media injection ports 74, such as balloon-type packers 7 and 9, in order to focus the force of the pressurized gas directly on the soil formation immediately in front of the ports.

Directional Nozzles

In the embodiment of the present invention shown in FIGS. 9 and 10, custom borehole casing 67a includes injection ports 69a located at predetermined intervals of depth and circumference through which the dry media can be injected by tubular probe 70a with directional nozzle means 78 attached at the end thereof, which comprises dry media forcing ramp 80. Dry media injection port 74a of directional nozzle 78, having aperture 21 with the indicated height, is brought into register with injection port 69a of custom borehole casing 67a, allowing the pressurized gas with entrained dry media to be injected directly into the soil formation. Injection port 69a in custom borehole casing 67a may be equipped with temporary plugs 76a or with the protective closure means for dry media ports described in detail further below. These serve the function of preventing grit and other unwanted materials from the soil formation from entering the borehole. Sealing means must also be provided between custom borehole casing 67a and tubular probe 70a, above and below dry media injection ports 74a, such as doughnut seals 53 and 54, in order to focus the force of the pressurized gas directly on the soil formation immediately in front of the ports.

Directional Nozzle and Self-Advancing Borehole Casing—Single Unit

Directional nozzle means may also be employed which are used in combination with a self-advancing borehole casing to form a single unit, such as those illustrated in FIGS. 11, 12, 13 and 14. The single unit 82 comprises outer jetting pipe 84 defining jetting annulus 85, and inner dry media injection pipe 86, with directional nozzle means 88 at the end thereof, which comprises dry media forcing ramp 90, and which is equipped with jetting ports 92 opening in a downward direction through which high velocity pressurized gas is ejected in order to cut through the soil formation to produce the borehole (not shown), which will typically be one characterized by low stability geologic conditions. Dry media injection port 94 of directional nozzle 88, having aperture 21 with the indicated height, is constructed so as to be in register with injection port 89 of outer jetting pipe 84.

Directional nozzle 88 must also include protective closure means 96 for blocking dry media injection port while the tubular probe is being advanced by drilling in order to prevent the entry of unwanted grit and other materials from the soil formation into the dry media injection port 94 while the drilling operation is being carried out. Without such means, these materials will block dry media injection port 94 and seriously impair the functioning of directional nozzle 88. This problem does not arise in the course of those drilling operations in which the borehole is first produced in a conventional manner and the tubular probe with nozzle means attached is later introduced into the completed borehole. The protective closure means for the dry media ports may be 1) of the trapdoor type which have a hinged or sliding movement which may be assisted by springloading, e.g., a retractable door means such as that shown as 96; 2) of the mitral valve type which employ a circular or parallel lateral arrangement of members which readily permit the movement of the pressurized gas in one direction while preventing the movement of grit and other materials from the soil formation in the opposite direction such as that shown as 96*a* in FIG. 11*a*; and 3) of the one-way valve type which utilize a buoyant sphere movable within a cylindrical tube by either the pressurized gas in one direction or by the grit and other materials from the soil formation in the other direction, and are so configured that the buoyant sphere engages and seals a circular opening in one end of the cylindrical tube when moved in one direction, but is prevented from blocking the corresponding circular opening in the other nd of the cylindrical tube and opposite direction, by a spacer element that permits the pressurized gas to flow around it such as that shown as 96*a* in FIG. 11*b*. Whatever protective closure means and nozzle design are selected, they should be characterized by the smallest possible number of moving parts and should rely on the forces produced by the pressurized gas stream and by the soil formation for their operation, in order to provide a nozzle which is functional and reliable and not likely to result in significant down time for repair or replacement.

Preferred Embodiment Dry Media Injection System

A preferred embodiment for the dry media pneumatic injection method of the present invention, and apparatus means which may be used to carry it out, are shown schematically in FIG. 15. Supply means 59 comprises a dry media feed system which is in fluid communication with a tube trailer 61. The tube trailer 61 is the source of the gas stream, in this case compressed air, which is used to carry out the pneumatic injection of the dry media, and is not only mobile, but is able to provide air flow at 2400 psi of sufficient duration, 45,000 SCF, to permit injection of the desired amount of dry media. For example, where the dry media injection system is used as a starter for in sits vitrification, the dry media will comprise graphite, and the supply tank 59 will hold from about 50 to about 100 gal of graphite. A high-flow dome loaded regulator 63 is used to control the flow rate and pressure of the injected air. The dry media injection system is operated in parallel to the main pneumatic injection system, and preferably consists of one to several cartridge-type reservoirs, such as that shown at 59. It is preferred that all regulators and valves, such as those shown at 65, be remotely controlled electronically to protect the safety of operating personnel.

The ratio of pressurized gas to dry media should be within the broad range of from about 100:1 to 10,000:1, on a volume to volume basis. The type of soil formation into which the dry media is being injected has a significant impact on the ratio; and the fact that the ratio is based on volume means that the heavier dry media compositions will also have an impact on the ratio. For example, where the dry media composition is graphite, the preferred range will be from about 100:1 to about 1000:1, while a more preferred range will be from about 150:1 to about 600:1. By contrast, where the dry media composition is iron particles, the ratio will be in the range of from about 500:1 to about 2000:1.

In another embodiment for supplying dry media in accordance with the present invention, the dry media supply tank may have its own compressed air supply in the form of a tube trailer, which supplies an air stream at the same pressure and for the same duration as its counterpart tube trailer which supplies air directly to the tubular probe in the bore hole. This is an alternate arrangement to that shown in FIG. 15, both of which assure that the dry media is supplied to the injection gas stream under pressure. It is necessary to exercise some caution with the embodiment involving two tube trailers, however, since there is some danger of backflow at the junction of the conduit carrying the dry media, and the main conduit for the gas stream.

The artisan will be aware of other means which are available for dispensing the dry media to the pressurized gas stream so that said dry media will become efficiently dispersed and entrained therein. Such other means which would be suitable include those known in the dispensing art, e.g., mechanical means such as auger driven feed devices and those which utilize a fluidized bed of the dry media. Other suitable devices may employ a Bernoulli valve that uses the movement of the pressurized gas stream to create a negative pressure which pulls the dry media into the gas stream. However, despite the number of suitable mechanical dispensing devices which are available, it is still preferred to use a pressurized feed system for the dry media of the type described above, in carrying out the present invention.

It is often desirable in a process carried out in accordance with the present invention, to utilize two or more dry media compositions either simultaneously or sequentially. Such embodiments are accomplished by the use of a multiple tank system or an array of cartridge-type feeders. The contents of each tank or cartridge can be metered by means of valves which regulate the flow of the gas stream into and out of each tank or cartridge. Any number of tank or cartridges, as well as any combinations thereof, may be employed. Thus, any combination or amount of dry media compositions can be used. After the dry media compositions to be used are mixed together by being commonly entrained and agitated in the gas stream, they then pass into the above-soil portion of the tubular probe, and are suspended in the high pressure, high flow rate stream of compressed air or other gas, passing through the tubular probe to the soil penetrating portion thereof, on its way to the injection nozzle.

Preferred Apparatus

A preferred apparatus for carrying out the methods of the present invention is illustrated in FIG. 16, in which a compressed air source 97 supplies pressurized gas for the entire system. The desired operating pressure as well as the safety of the system are assured by pressure relief valve 98 together with high-flow dome loaded regulator 100 which is used to control the flow rate and pressure of the injected air. The operator of the system uses manual 1½ inch ballvalves 104 to select one of the following five (5) operating modes: 1) compressed air only to the borehole for pneumatic fracturing; 2) compressed air through only the first branch with a first dry media holding tank 106 then to the borehole for injection of the first dry media; 3) compressed air through only the second branch with second dry media holding tank 106 then to the borehole for injection of the second dry media; 4) compressed air through both the first branch and the second branch with first and second dry media holding tanks 106 then to the borehole for injection of the first and second dry media mixed together; or 5) where the first and the second dry media are the same, carrying out step 2) followed by step 3) to the borehole for injection of the dry media for twice the amount and/or time otherwise possible. Dry media holding tanks 106 are "cartridge-type" reservoirs with a preselected capacity for dry media. Finer control of the flow path, flow rates and pressures of the compressed air is controlled and determined by the 2 inch pneumatic ballvalves 102 and the 1½ inch pneumatic ballvalves 108, which allow the operator to further control the compressed air flow to the borehole, and compressed air flow to dry media holding tanks 106. A line to each holding tank 106 pressurizes the tanks and forces the dry media contained therein into the main compressed air stream. Sight glasses 110 in the dry media holding tanks 106 permit the operator to observe the movement of dry media into the compressed air stream. The pneumatic ballvalves 102 and 108 can be set within a wide range of variable pressures, which permits the operator to control the flow rate and pressure of the compressed air and the rate of entrainment of the dry media in the compressed air stream. This multi-component injection system improves both the control and reliability of the dry media injection process. All of the regulators and valves are pneumatically operated but remotely controlled electronically in order to assure the safety of operating personnel. Key process parameters, e.g., flow rate, pressure and ground surface heave, are monitored on a real-time basis to permit system control and adjustment during the dry media injection process. These parameters may vary considerably, depending upon the nature of the dry media being injected and the application utility involved, but the optimum parameter values are readily determined by routine experimentation of the type described herein. For example, for a pneumatic fracturing and in situ vitrification process, the system will be typically be operated at from about 100 to about 600 psi, preferably from about 200 to about 500 psi (3,450 kPa), delivering from about 500 to about 2,500 scfm (118 m³/s), preferably delivering volumes at the higher end of the range, for a period of about 10 minutes. The delivery rate of the graphite/glass frit media will usually be in the range of from about 50 to about 100 lb/min (about 23 to about 45 kg/min).

Dry Media Compositions

The dry media which can be used in the practice of the present invention comprise a very large variety and number of different materials, the selection of all of which depends upon the particular application utility involved. Provided with the guidance afforded by the description herein, however, the artisan of ordinary skill will be able to select the appropriate dry media for the specific application utility involved, and may even be able to suggest additional application utilities not specifically recited here, and the dry media that would be suitable for use in that utility. All such application utilities and the dry media used to accomplish and-carry them out are contemplated to be a part of the present invention. In order to provide further guidance in that regard, the groups and types of preferred dry media for use in the present invention comprise one or more members selected from the group consisting of 1) silica, including sand and glass frit; 2) carbon, including graphite and powdered charcoal; 3) powdered metals including copper, nickel, tin, zinc, iron, magnesium, aluminum, phosphorus, chromium, cadmium, palladium, platinum, or alloys and salts thereof; 4) beads and particles of synthetic resin, including polymers, copolymers and terpolymers, e.g., polyacrylates including those prepared from acrylic and methacrylic acid; polyolefins including those made from ethylene, propylene, and butylene; polyvinyl chloride; polystyrenes; polyesters; polyimides; polyurethanes; polyamides; and polycarbonates; and mixtures of any of these; 5) organic compounds capable of remediating a soil formation contaminated with non-naturally occurring compositions, especially chlorinated organic compounds, i.e., hydrocarbons, by oxidizing, reducing, or neutralizing said non-naturally occurring compositions, e.g., dechlorinating chlorinated hydrocarbons, by reacting with said non-naturally occurring compositions to produce non-contaminating reaction products, and by catalyzing the chemical transformation of said non-naturally occurring compositions into non-contaminating products, including catalysis by enzymatic action; and 6) compositions which promote the growth and activity of microorganisms in the chosen soil formation, e.g., direct release or time release nutrient pellets, buffers, oxygen sources and inocula in granular or particulate form.

Application Utilities for Dry Media

The methods and apparatus of the present invention find advantageous applications in a number of in situ remediation technologies, where their use can extend and improve the results obtained heretofore. Soil formations in need of such remediation contain volatile organic compounds comprising hydrocarbons, especially petroleum hydrocarbons, including the products and byproducts of fuel production by cracking crude oil; aromatic compounds, especially hydrocarbon aromatics including benzene, toluene, xylene and similar organic contaminants; halogenated organic compounds, especially chlorinated hydrocarbons; and more complex organic compounds, such as those which are the products or byproducts of chemical manufacturing. Organic compound contaminants which are "volatile", as that term is used in the present invention, are those which have a relatively high vapor pressure and can be found in vapor form at relatively low temperatures. However, there is also included within the definition of "volatile organic compounds" (VOCs), as that term is used in the present invention, organic compounds which are "volatilizable", i.e., capable of being made volatile.

The dry pneumatic injection of dry media compositions into soil formations achieved with the present invention, avoids all of the many disadvantages which attend the use of liquid processes, e.g., hydraulic fracturing. These include dispersion of the contaminants in the soil, collapse of venting pathways, and viscous resistance. The dry media injection process of the present invention can be used to enhance such remediation technologies as bioremediation, vitrification, vapor extraction, pump and treat methods, and chemical reduction. The dry media injection process of the present invention also possesses a number of advantages over existing technologies. For example, in geologic formations with low to moderate permeability, the invention pneumatically creates artificial fractures which extend to substantial radii. Pneumatic injections are used initially to create an artificial fracture network in the soil formation. In the case of cohesive soils with low to moderate permeability, this fracture network is formed as a result of brittle failure of the formation and its propagates to substantial radii, usually from about 15 to 50 feet. The fracture propagation also results in greatly enhanced air flow throughout the formation. It has been found that postfracture air flows of the main fracture well are from about 13 to 178 times higher than prefracture air flows.

In non-cohesive soils, on the other hand, which have moderate to high permeability, the invention pneumatically cuts the soil formation to establish a planar void. Granular sands and gravels are examples of such non-cohesive soils, and they do not exhibit brittle behavior, and thus do not fracture in the conventional sense. As described above, the novel plate-type nozzle of the present invention is unique in its ability to prepare such soils for the injection of dry media, as a result of its ability to create planar voids by means of a pneumatic intrusion or pneumatic cutting action. This mechanism of action was observed and delineated by bench scale experiments using Plexiglass® brand polyacrylate test tanks. Each planar void which was created was maintained in a dilated state for a period of a few minutes. Apertures ranged from 1 to 6 inches. The high velocity planar nozzle has been specifically designed to focus the air jet over a discrete area of the soil formation, maximize the exit velocity of the air into the formation, minimize the pressure loss, and minimize the clogging potential of the dry media as it enters the formation.

An important aspect of the dry media pneumatic injection system of the present invention is the ability of the dry media to form a continuous plane which then establishes connectivity in the formation. This aspect of the present invention may be used in a number of valuable applications, e.g., accelerating contaminant treatment in the soil formation. It has been found that the injected dry media completely fills the fracture network created by the pneumatic fracturing and subsequent gas flow, forming a discrete granular lens in the formation, which can be made continuous between the injection point for the dry media and adjacent wells established in the formation, e.g., for extracting vapor. This connectivity feature can be used in a variety of ways, depending upon the remediation process involved. Vapor extraction or pump and treat remediation processes can be enhanced by establishing a sand lens which serves as a proppant, as well as a channel for fluid flow. In bioremediation systems, the media can consist of nutrients, buffers, oxygen sources and inoculum in a granular form, to enhance subsurface microbial activity. For in situ vitrification processes, graphite can be injected to serve as an electrically conductive starter path for melt initiation. Bench scale experiments have been conducted in which a mixture of graphite and glass frit was injected into a test soil in order to connect two carbon electrodes installed vertically in a Plexiglass® brand polyacrylate test tank. The continuity of the graphite lens was verified electrically by applying a variable voltage across the electrode. The thickness of the graphite/glass frit layer ranged from 0.5 to 2 inches. The improvement in electrical conductivity for these experiments ranged up to 833 times.

It is possible to vary the lens thickness of the injected media, depending upon the specific remediation application involved. A solid lens of dry media from one to several centimeters in thickness can be used where a continuous, porous lens is desired. Yet, in other applications, it is appropriate to inject only a limited amount of dry media to act as a dispersed proppant. This technique has the advantage of allowing some open fracture flow to also occur in the soil formation, which is typically more efficient than solid porous media flow. This results from the fact that flow in open fractures is governed by the cubic law, while flow in filled fractures is governed by Darcy's law. However, installation of a dispersed proppant requires careful sequencing of the injection in order to avoid excess packing in the fracture.

Another advantageous feature of the present invention is the ability to inject fragile dry media without serious disruption of its physical makeup. An example of dry media which is susceptible to damage during injection is a material which has a time release coating on it to form a pellet, so that the contents of the pellet are released into the soil formation over a period of time. Time release nutrient pellets to enhance the growth and activity of microorganisms in the soil formation are an example of such fragile dry media. It has been possible, in accordance with the methods and apparatus of the present invention, to accomplish pneumatic injection of such fragile dry media without significant damage to the media. This has been accomplished in one embodiment by incorporating gradual flow transitions within the piping network in order to minimize turbulence and eddying of the carrier gas. Further, potential impact points on the internal surfaces of the injection system have been coated with a resilient polymer which reduces the potential for abrading and pulverizing of the fragile media. In another embodiment, powdered graphite which acts as a lubricant, has been mixed together with, or dispensed along with, the dry fragile media during pneumatic injection. These measures are critical especially in the case of time release coatings, since damage to the time release coating essentially destroys the effectiveness of the media, and may even prove to be more harmful than if no media had been injected at all.

The methods and apparatus of the present invention for pneumatic injection of dry media into soil formations has been found to be applicable to a wide range of hydrogeologic conditions. The present invention can be applied to the vadose zone, the saturated zone, and perched water zones at contaminated sites. It is a significant advantage of the present invention that soil moisture does not interfere with the transport of the dry media into the soil formation, as a result of the elevated air pressures which are used in the present method. There is additional versatility in the methods and apparatus of the present invention with regard to the lithology and stratigraphy of a given contamination site, since they can be used in rock as well as soil formations.

The pneumatic fracturing and dry media injection methods and apparatus of the present invention provide many advantages over such prior art processes as hydraulic fracturing, which, as the name implies, is a fundamentally liquid system. It uses water, slurry, or other liquid agents to create the fractures and carry the granular media into the fracture network. Hydraulic fracturing uses large amounts of liquid to create the fractures, transport the media, and flush out the polymer carriers. These liquids can remobilize the contaminants in the soil formation, however. Pneumatic fracturing not only avoids these problems, but offers such advantages as the promotion of microbial growth, thus enhancing bioremediation. Another significant advantage relates to the considerable difference between the flow viscosity of air or other gas compared to that of hydraulic injection fluids. Because the flow viscosity of air is much lower, the pneumatic injection and dry media transport aspects of the present invention can be carried out at much higher flow rates than are possible with hydraulic methods, thus greatly increasing the overall productivity and efficiency of the method of the present invention over such prior art methods. Yet another important advantage of the method of the present invention results from its ability to focus treatment on discrete zones within a much larger geologic formation. Thus, it is possible to treat a contaminated zone with virtually surgical precision in directing dry media compositions thereto which are to be used in its remediation. The methods of the present invention can also be applied to soil formations on which buildings have been erected or in which utility lines have been buried, with only the most minimal disruption of the sites involved.

For example, a method within the scope of the present invention is one for reducing or eliminating non-naturally occurring, subsurface, liquid or solid contaminants from one or more soil formations by establishing an in sine bioremediation cell therein to degrade said contaminants. This method follows the general procedures described above for other methods, but employs as the dry media, nutrient material which will enhance the growth and activity of microorganisms present in the contaminated soil formation, which are capable of eliminating or reducing the contaminants by degrading or transforming them. These nutrient materials may comprise inocula, agents to generate the desired pH, buffers to maintain said pH, and nutritive substances, especially those with a time release coating which can often be fragile, especially under harsh injection conditions. It is also necessary that the gas which is injected continuously be one which is oxygen-containing, e.g., compressed air or oxygen, where the microorganism whose growth and activity are being promoted is an aerobic microorganism. Where the microorganism is anaerobic, on the other hand, a non-oxygen containing gas, e.g., nitrogen, must be used.

Another application utility for the methods of the present invention is one for reducing or eliminating non-naturally occurring, subsurface, liquid or solid contaminants from one or more soil formations by introducing therein chemical agents which reduce, oxidize, neutralize, cleave, decompose, chelate, complex, catalytically transform, or otherwise entering into chemical reactions with said contaminants whereby the qualities which make them undesirable contaminants are permanently altered. This method follows the general procedures described above for other methods, but employs as the dry media, a reactive chemical agent of some type. The specific chemical agent selected will be determined to a large extent by the composition of the contaminant present in the soil formation.

Another application utility is one for isolating non-naturally occurring, subsurface, liquid or solid contaminant zones within one or more soil formations by creating vitrified underground structures which produce such isolation, either by encasement or otherwise. This in sift vitrification is accomplished by using as the dry media in the method of the present invention described above, one or more compositions which will produce the amount of electrical conductivity and electrical resistance necessary to result in the creation of conductive resistance starter paths. The dry media compositions are applied in amounts and predetermined patterns, at any depth, and at any location in the soil formation, which will produce the desired isolation after vitrification takes place. Thereafter, electrical current is applied to the soil formation through the conductive resistance starter paths by the use of electrodes in a conventional manner. The gas stream which is used in the initial pneumatic fracturing and then in the continuous flow during which the dry media is introduced, is preferably not oxidizing or oxygen containing, since oxygen will have a tendency to oxidize the materials from which the conductive starter path is made, thus creating an open circuit and preventing vitrification.

Another application utility within the scope of the present invention is one for reducing or eliminating non-naturally occurring, subsurface, liquid contaminants from one or more soil formations which do not exhibit self-propping behavior, e.g., softer, sensitive clays, wherein there is used as the dry media a granular propping agent, e.g., sand. The method creates and maintains a continuous plane of fluid flow channels which establish connectivity in the soil formation and thereby accelerate contaminant treatment by conventional techniques such as the pump and treat system, or other methods of the present invention described herein.

Dry Media Transport Mechanisms

After a soil formation has been fractured and dilated, dry granular media compositions are pneumatically injected into the soil formation. In one embodiment of this process, while the soil formation is being maintained in a dilated state by the continuous injection of pressurized air or other carrier gas therethrough, dry granular media is injected into the air or other carrier gas stream under pressure, whereupon it becomes transported into all of the fractures and voids of the fracture network which has been created in the soil formation. High air flow rate and velocity are maintained to keep the granular media suspended until its deposition in the formation. The selection of the dry media depends on the specific application for which it is to be used, and customized blends can be used in many instances. Bench scale experiments have shown that when the discrete fractures or voids, which are created by fracturing and maintained in a dilated state by continuous air flow, are filled by the injection of the dry media, that the thickness of the media lenses ranges from 1 to 3 inches. The term "media lens" as used herein refers to voids and channels which have a double-convex or related type of shape, which are created in the soil formation and extend in a planar manner therethrough and are subsequently filled by injection of dry media. Typically, such a media lens has been found to extend in a planar manner, usually for several feet, into the soil formation. As a consequence of the formation of such media lenses throughout the soil formation, considerable quantities of dry media must be delivered to the formation. The pneumatic injection system of the present invention is capable of producing mass flow rates in the range of 42 to 116 lbs. of dry media per minute, which is a rate of injection sufficient to fill subsurface fractures in a matter of minutes.

In order to improve the efficiency of the dry media injection processes of the present invention, it was deemed important to obtain a better understanding of the basic transport mechanisms by which the solid particulate dry media were dispersed and distributed through various soil formations. In order to study these phenomena, mixtures of glass frit and graphite were injected into soil formations as part of an in situ vitrification process. The starter path established by the subsurface pneumatic injection process must have sufficient continuity and thickness to transfer the electrical power required to initiate vitrification. Once a melt is initiated, the resistance of the lens of molten soil will decrease making it electrically conductive. The heat is then transferred to adjacent layers, thereby sustaining the vitrification process. Previous studies have shown that the electrical resistance of the starter path must be 50 ohms or less to initiate a melt. See Luey and Seiler, "Evaluation of New Starter Path Geometries for In Situ Vitrification", PNL-10122, Pacific Northwest Laboratory, Richmond, Wash. (1994). As a comparison, the resistivity of natural soil and rock formations is typically in the range of 1,000 to 100,000 ohm-feet.

Although liquid-solid transport in geologic formations has received extensive study in the petroleum and water well industries with regard to enhancing hydraulic fracturing, the rheology and propagation velocities of hydraulic fracture fluids are significantly different from those which characterize the pneumatic injection system of the present invention. Furthermore, studies on gas-solid transport in geologic formations have been very limited. See Gottschling et al., "Nitrogen Gas and Sand: A New Technique for Stimulation of Devonian Shale", *Journal of Petroleum Technology*, May, 901–907 (1985). Accordingly, it has been useful to model solid particle transport in gaseous fluid streams Within geologic formations.

Interstitial Transport in Granular Medium

Figure 19A:
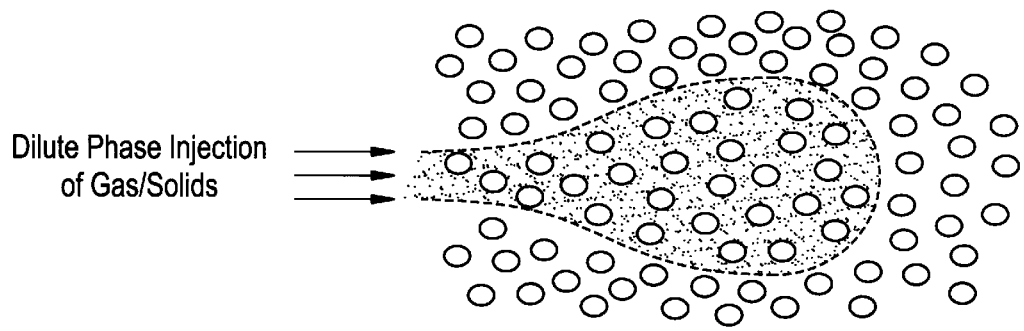
FIGS. 19A, 19B, 19C are schematic representations of transport mechanisms for the dry media comprising interstitial transport in granular medium, discrete fluidization in granular medium, and discrete fracture in cohesive medium, respectively.
Figure 19B:
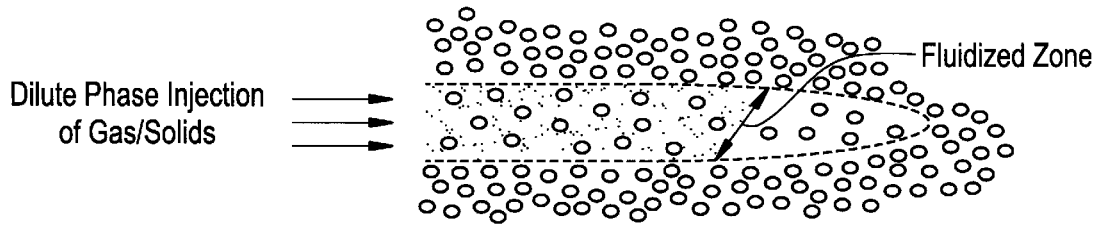
Figure 19C:
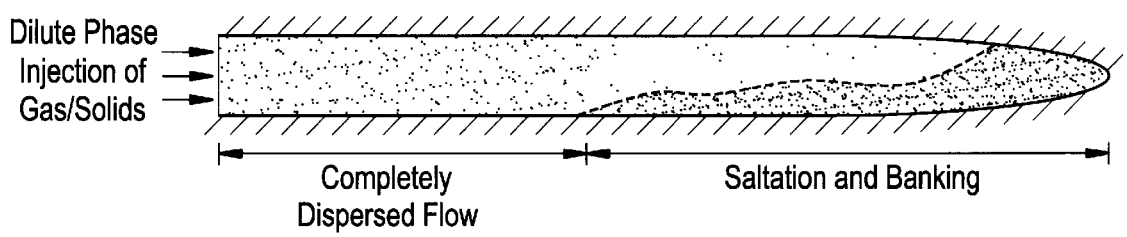

The three fundamental mechanisms of transport which are thought to control the pneumatic injection processes of the present invention are illustrated in FIGS. 19A, 19B, 19C. The first transport mechanism, depicted in FIG. 19A, involves transport of the injected dry media through the interstices of the geologic formation, i.e., soil formation. The necessary condition for interstitial transport occurs when the mean diameter of the injected particles is smaller than the effective diameter pore spaces in the geologic formation. In commercial field applications, this is not expected to be a primary transport mechanism as a result of the usual ratio of these diameters. This mechanism will constitute an important secondary transport process, however, as the injected dry media penetrates the surface boundaries of the injected media lens. Under these conditions, it will have a significant effect on gas leakoff into the soil formation, and will, therefore, affect both particle transport and fracture propagation.

Three basic mechanisms have been identified which limit interstitial particle migration through soil, as the result of studies of filter behavior and filter criteria. See McDowell-Boyer and Sitar, "Particle Transport Through Porous Media", *Water Resources Research*, 22(13), 1901–1921 (1986). These mechanisms are surface caking, straining, and physicochemical processes. For dry media pneumatic injection, it is expected that either straining or caking will predominate, depending on the ratio of mean dry media diameter, $d_m$, to the mean soil particle diameter, $d_p$. Penetration criteria can be developed by analyzing the statistical particle distribution and shape of both the dry media and the matrix, i.e., geologic formation. These criteria can be verified using a horizontal infiltrometer operated under variable pressure gradients, so that the effect of each mechanism on formation leakoff can be modeled and predicted. These criteria are expected to take the following form"

| | |
|---|---|
| $d_m/d_p < \psi$ | => no particle penetration discernible, i.e. surface caking; significant reduction in matrix permeability |
| $A > d_m/d_p > \xi$ | => some particle penetration; some reduction in matrix permeability |
| $d_m/d_p > \delta$ | => free transport of particles through matrix | where $\psi$, $\xi$, and $\delta$ are constants, established by analytical and experimental methods.

The second transport mechanism is transport through a fluidized aggregate lens, as illustrated in FIG. 19B. This mechanism occurs when the treated formation is cohesionless and the injected gas velocities are sufficient to keep the geologic particles in suspension. The pore space dilation and oscillatory particle motion allows passage of the injected solid media through the fluidized geologic matrix. The aggregate fluidization phenomenon has been studied in the chemical engineering field of fluidized bed reactors. See Davidson and Harrison, *Fluidization*, Academic Press, New York, N.Y. (1971). Exploratory excavations of the dry media injected lenses of the present invention have suggested that this mechanism is the primary transport mechanism where the soil formation comprises coarse textured sands and gravels. A principal concern with this transport mechanism is maintenance of a dilute condition of the injected dry media with respect to the carrier gas in order to prevent clogging, and to achieve maximum dry media penetration of the soil formation. Matrix segregation and media degradation during injection are also of concern. The minimum fluidization velocity is a function of soil porosity, shape and size range of the particles, and the viscosity of the injection fluid. The pressure drop-velocity relationship in a fluidized bed is expressed by the following equation at incipient fluidization [Ergun, *Chem. Eng. Progr.*, 48, 89 (1952)]:

$$\frac{\Delta P_B}{H_{mf}} = 150 \frac{(1-\varepsilon_{mf})^2}{\varepsilon_{mf}^3} \mu \frac{U_{mf}}{d^2} + 1.75 \frac{(1-\varepsilon_{mf})}{\varepsilon_{mf}^3} \rho_f \frac{U_{mf}^2}{d}$$

$\Delta P_B$ pressure drop across fluidized bed $H_{mf}$ bed height at incipient fluidization point $U_{mf}$ minimum fluidizing velocity $\mu$ viscosity of the fluid $\rho_f$ density of the fluid $\varepsilon_{mf}$ bed voidage at incipient fluidization point However, fluid-particle interactions in a fluidized bed are different from those occurring during fluidization in pneumatic injection of dry media. The direction of the fluid flow for the former is in the same plane as the gravitational forces, while it is perpendicular in the latter. The fluid-particle interactions of gas jets in fluidized beds, discharging in the horizontal direction, provide a close parallel to the fluidized state which occurs during pneumatic injection of dry media.

The third transport mechanism is particulate movement through a discrete, open fracture, as illustrated in FIG. 19C. This condition is encountered when the integrated dry media injection process is applied to fine-textured cohesive formations such as clay and bedrock. These formations have a naturally low permeability and thus can sustain a pressurized, discrete fracture. In this transport mechanism, the particles remain suspended as long as the critical suspension velocity is maintained. As velocities attenuate radially away from the injection point, particle transport changes to saltation and banking. The field of sediment transport provides models for this transport mechanism. See Boggs, *Principles of Sedimentology and Stratigraphy*, Merrill Publishing Company, Columbus, Ohio (1987). The change in concentration of particles in the injection stream with increasing distance from the source, which effects the particle distribution within the fracture, can be approximated by the equation which expresses two phase flow between horizontal parallel plates with turbulent low:

$$N_A = N_p \exp\left[-\frac{v_s l}{uh}\right]$$

$h$ distance between the parallel plates $N_p$ airborne concentration of particles at the source $N_A$ airborne concentration of particles at a distance from the source $u$ velocity of the fluid $v_s$ terminal settling velocity of the particles $l$ distance from the source Studies of this transport mechanism include analysis of spatial and temporal distribution of the injected media, graphite, within the soil matrix. A critical measurement in this regard is precise determination of the graphite content at all points in the injected lens, which largely dictates the electrical continuity of the lens. Graphite content can be measured in a number of ways because of its diverse properties. Graphite is the hexagonally crystallized allotrope of carbon formed from the metamorphism of carbonaceous material in sedimentary rocks. It has perfect cleavage in one direction, and thus exists as thin, elongated flakes which are flexible and prone to further foliation and breakage. Organic carbon and iron oxide are common impurities. Graphite is a good conductor of heat and electricity, is almost chemically inert, and is extremely refractory.

DESCRIPTION OF PREFERRED EMBODIMENTS

There follows a description of various preferred embodiments of the resent invention. These working examples are intended to be illustrative only, and are not intended to in any way limit the scope of the present invention which is herein claimed.

EXAMPLE 1

Model for Predicting Pressure and Velocity Distributions

A study was undertaken to investigate selected physical properties involved in utilizing pneumatic fracturing together with pneumatic injection of dry media to carry out in situ vitrification (ISV). Model analyses were performed in parallel with bench scale experiments. Predictions relating to pressure and velocity distributions were made using an equation which took into account gas compressibility effects, and assumed that conditions were isothermal. For laminar flow the exponent in the equation relating to the nature of the flow was 3, thus establishing a cubic relationship between flow and aperture. By solving the equation for $P_2$, it was possible to calculate the pressure distribution in the formation at selected radii. The pressure at the injection point, $P_1$, was estimated to be 40 psi based on a study of fracture maintenance pressure. The fracture aperture was assumed to be 0.4 in. (1 cm) and the injection flow rate was assumed to be 3,000 cfm. The pressure drop along the fracture was calculated to be minimal owing to the relatively large aperture. This model does not, however, take into account formation leakoff.

The second part of the model estimated the velocity distribution in the discrete fracture. A finite difference approach was used, talking into account air leakoff into the formation. Prediction of air velocity was critical to the integrated ISV system, since velocity would determine the maximum radius of fracture penetration, as well as the distance which the graphite/glass frit dry media could be transported through the soil formation. The physical model used for velocity distribution assumed leakoff of the injected air into the formation across the upper and lower boundaries of the fracture according to the pneumatic gradient through the adjacent porous medium. The leakoff was calculated in successive annular rings centered on the injection point. Thus, flow correspondingly declined with increasing radius. The model was solved using a range of assumed values for aperture (b), pneumatic conductivity ($K_p$), and pneumatic gradient ($i_p$). Typical calculated results are set out in the table of values below.

TABLE 1

| $K_p$* (m/s) | $i_p$** (unitless) | b (m) | max radial distance (m) |
|---|---|---|---|
| 0.0007 | 4500/1500 | 0.05 | 0 |
| 0.0007 | 1500/500 | 0.05 | 0 |
| 0.00007 | 2250/750 | 0.025 | 1.1 |
| 0.000007 | 1500/500 | 0.05 | 5.3 |
| 0.000007 | 4500/1500 | 0.05 | 2.9 |

*The hydraulic conductivity of a particular soil formation of interest was reported to range from 0.001 to 0.1 m/s. Converting to pneumatic conductivity, and extending the lower boundary of $K_p$ one order of magnitude to account for caking effects, a range of 0.000007 to 0.0007 m/s was obtained and used for the analysis.
**The pneumatic gradient for leakoff was estimated at a depth of 5 m. Due to the absence of an atmospheric boundary, the downward gradient was assumed to be one third of the upward gradient. Key: upward gradient/ downward gradient $i_p$ was taken as the average of the gradients.

It was found that flow dissipated quickly, although an effective radius up to a few meters was attainable. The analysis also predicted minimal penetration for the combination of high formation permeability and gradient. However, this model did not take into account the results that could be obtained using the high velocity planar nozzle of the present invention.

Model for Predicting Transport of Injected Media in Discrete Fractures

The potential for vertical and/or horizontal segregation and stratification of the graphite/glass frit particles during the dry media injection was investigated. The mechanics of particle transport in an open pneumatic fracture were determined to be similar to those of sediment transport in river beds. The threshold for grain movement was a function of fluid viscosity and particle characteristics, e.g., shape, size, sorting of grains, and density. The method used to model the transport of graphite/glass frit in the discrete fracture was the Shields diagram method, one of the most widely used mathematical relationships for determining the critical suspension velocity, which is the minimum velocity at which the particle remains in suspension, and can be used for particle transport in air as well as in water. This relationship plots dimensionless shear stress $\tau^*$ against grain Reynolds number $R_{eg}$, which is also a dimensionless quantity. The dimensionless shear stress increases with increasing bed shear stress and velocity decreases with increasing density and size of particles according to the following equation:

$$\tau^* = \frac{\tau_0}{(\gamma_s - \gamma_f) \cdot d}$$

where $\gamma_s$ = specific gravity of the particles $\gamma_f$ = specific gravity of the fluid $d$ = particle diameter $\tau_0$ = boundary shear stress Friction velocity in the grain Reynolds number is a measure of the turbulent eddying, and is therefore an indication of turbulence at the grain-fluid boundary. An increase in grain Reynolds number means either an increase in friction velocity and turbulence, an increase in grain diameter or a decrease in kinematic viscosity. The points above the curve indicate the condition under which the particles are in motion and capable of being transported, while the points below are stationary. The critical suspension velocity for graphite and glass frit deposition from the air stream using the Shields diagram method were estimated to range from 0.37 m/s–0.38 m/s and 0.35 m/s–0.39 m/s, respectively. The calculated values were considered estimates only, since it was necessary to extrapolate the data beyond the published extrapolation line. The similarity of critical suspension velocities between both particle types suggested that there was little potential for segregation.

EXAMPLE 2

Integration of Pneumatic Fracturing and In Situ Vitrification

This demonstration of the use of pneumatic fracturing and pneumatic injection of dry media comprising graphite particles and glass frit in order to carry out in situ vitrification was carried out at a formation in the Northwestern United States, referred to hereafter as the "NW" site, which is a glaciofluvial deposit consisting of coarse-grained soils, which is notably different from the fine-grained formations with low permeability that were the subject of other studies. Bench scale results established that the soils of this formation could be pneumatically intruded and that an electrically conductive starter path could be established. A simplified mathematical model was developed and used to predict the effective radius at the field scale. The most significant formation parameters which were found to affect the process were permeability, natural moisture content, and density. These experimental parameters exhibited both independent and interactive effects on the process effectiveness.

A pilot feasibility test was performed at the NW site with promising results. A starter path was created at a depth of 14 feet at two settings. Following insertion of the starter path, resistance measurements were made across the electrodes which showed that a suitable electrically conductive plane had been established. The results of these electrical measurements showed that the injected media reduced formation resistance from a natural level of 100,000–500,000 ohms down to less than 100 ohms. The resistance level established by the injection was considered low enough to support a melt, so the first test setting was powered up. After attaining a power level of 20 kW, the test was terminated due to increasing melt resistance. Subsequent excavation of these electrodes show that although a melt had begun around each of the electrodes, it had not coalesced into a continuous vitrified mass. The failure of this first attempt was attributed to insufficient power as well as the marginal interface between the conductive lens and the electrode.

Figure 20:
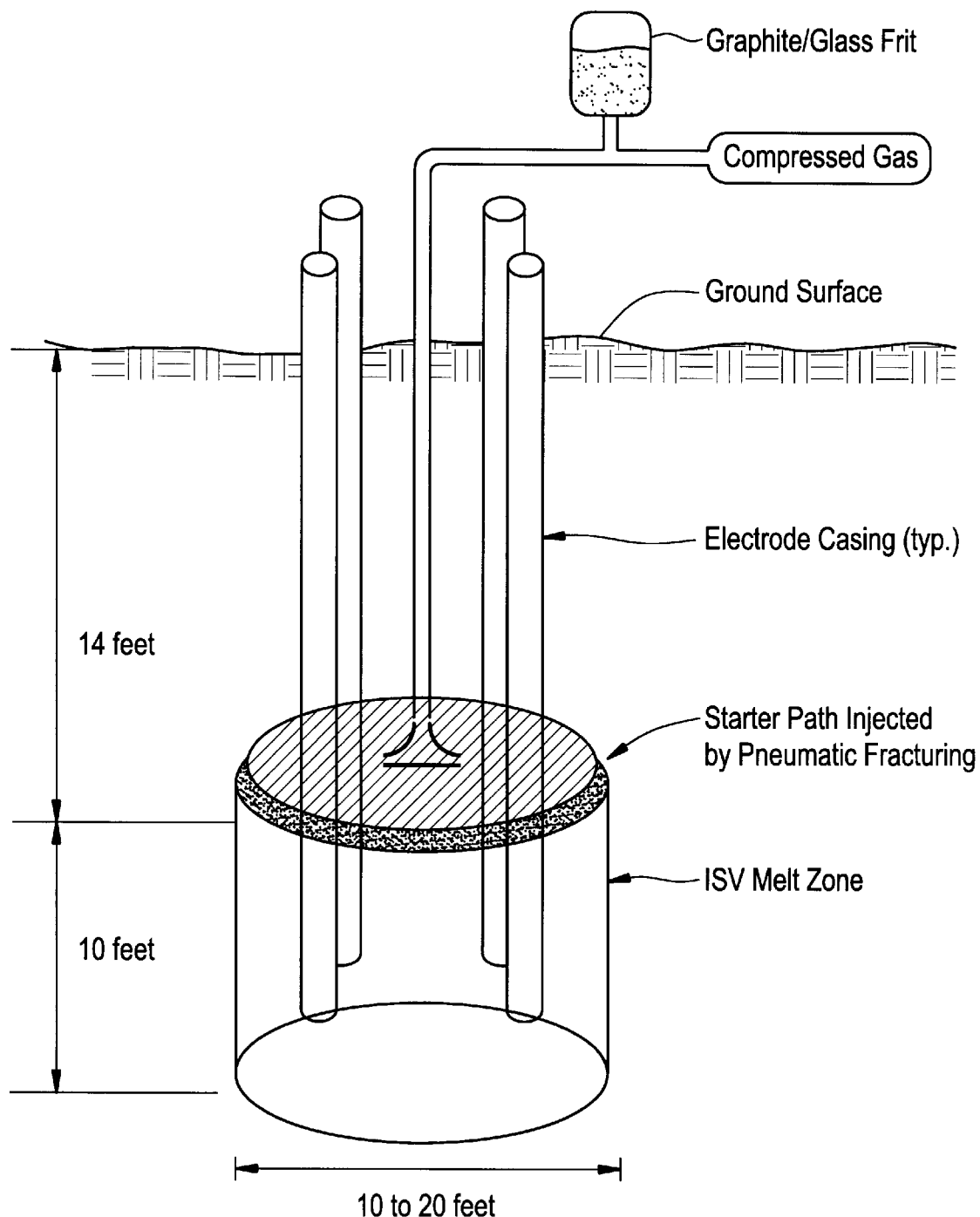
FIG. 20 is a schematic representation of apparatus of the present invention for carrying out in situ vitrification of a contaminated site.
Figure 21B:
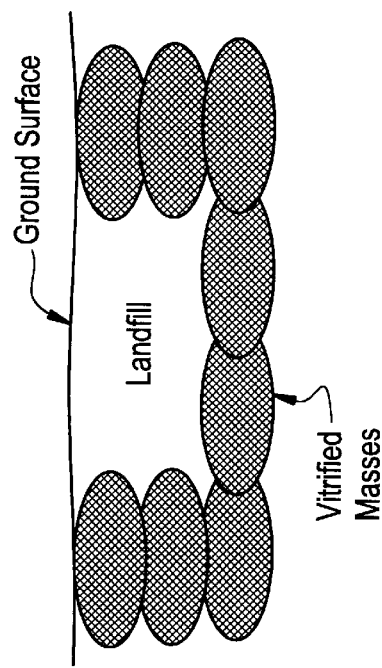
FIGS. 21A. 21B, 21C, 21D are schematic representations of the manner in which in situ vitrification may be carried out on four different types of contaminated sites comprising downward progressive vitrification, landfill encapsulation, spot vitrification, and bottom-up vitrification, respectively.
Figure 21D:
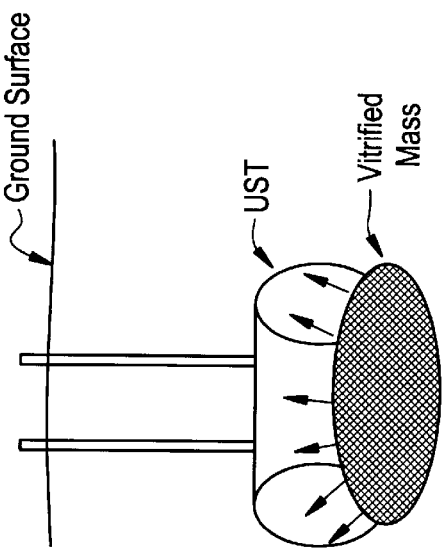
Figure 21A:
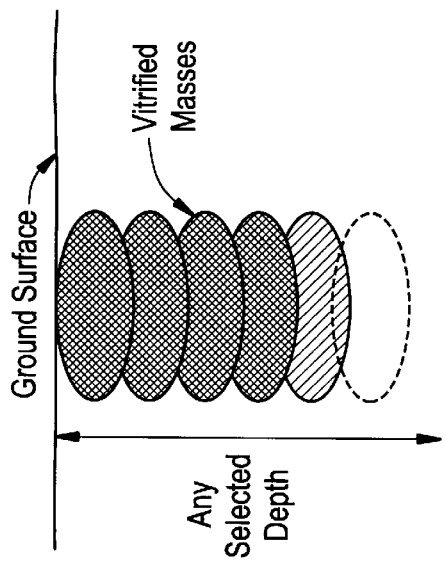
Figure 21C:
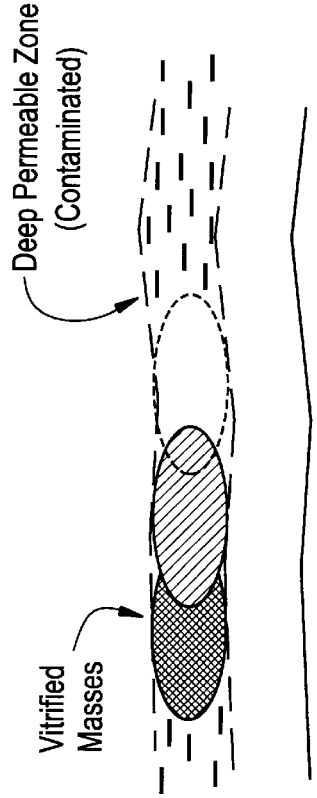

A second vitrification attempt was made at the second test setting, which followed an exploratory excavation to delineate the extent of the conductive lens and to improve its interface with the electrodes. The basic setup for this test setting is schematically represented in FIG. 20. During this second attempt, a melt was sustained for a 9 hour duration with power levels ranging up to 300 kW. Subsequent excavation showed that the vitrified soil mass weighed 2 tons and was composed of high-quality glass. This was believed to have been the first in situ melt ever initiated below the ground surface. The power requirements for this subsurface melt were 30% less than that typically observed for surface initiated melts, i.e., 0.71 kW/kg vs. 1.0 kW/kg. This finding indicates that subsurface initiation will probably have significant cost advantages over surface initiation, since power represents a substantial percentage of the cost of the basic in situ vitrification technology, and that these cost savings will more than offset the added cost of subsurface injection of dry media to establish the starter path.

What is claimed is:

1. An apparatus for pneumatically injecting at least one dry media composition via transport by at least one gas stream into a geologic formation, said apparatus comprising:

conduit means for carrying the composition and the gas stream into the geologic formation, said conduit means including:

a pipe portion for delivering the composition and the gas stream below the surface of the geologic formation, said pipe portion having a distal end, a proximal end, an inner surface which defines at least one bore/passage and an outer surface; and a supply portion for delivering the gas stream to said pipe portion, said supply portion including mixing means for adding the composition to the at least one gas stream, wherein said supply portion is capable of delivering both the gas stream and the composition to said pipe portion; and nozzle means attached to the distal end of said pipe portion, for directing the flow of the composition and the gas stream from said bore of said pipe portion into the geologic formation, said nozzle means including at least one exit opening, wherein the composition and the gas stream are capable of passing through said exit opening and into the geologic formation.

2. The apparatus according to claim 1 wherein said nozzle means accelerates the flow therethrough.

3. The apparatus according to claim 2 wherein said nozzle means includes a throat portion for accelerating flow therethrough.

4. The apparatus according to claim 1 further comprising a control means for selectively controlling the flow through said conduit means.

5. The apparatus according to claim 4 wherein said control means selectively controls the flow of the gas stream.

6. The apparatus according to claim 5 wherein said control means selectively controls the introduction of the composition into the gas stream through said mixing means.

7. The apparatus according to claim 6 wherein said control means allows the gas stream to flow into said pipe portion in a first state, whereby the gas stream is injected into the geologic formation in the first state; and wherein said control means allows the introduction of the composition into the gas stream in a second state, whereby both the composition and the gas stream are simultaneously injected into the geologic formation in the second state.

8. The apparatus according to claim 1 wherein said nozzle means is adapted to allow flow in at least one discrete direction which is generally transverse to the part of said pipe portion proximate said nozzle means.

9. The apparatus according to claim 8 wherein said nozzle means comprises a forcing cone having a tip which faces upstream.

10. The apparatus according to claim 8 wherein said nozzle means comprises a sloped portion which at least partially defines a throat of said nozzle means.

11. The apparatus according to claim 10 wherein said sloped portion is curved.

12. The apparatus according to claim 11 wherein said sloped portion is parabolic.

13. The apparatus according to claim 1 wherein said nozzle means is fixedly secured at a desired depth inside a borehole in the geologic formation.

14. The apparatus according to claim 13 further comprising at least two nozzle means disposed at respective depths in the borehole.

15. The apparatus according to claim 14 wherein said pipe portion is movable at least between said at least two nozzle means.

16. The apparatus according to claim 14 wherein said pipe portion is adapted to deliver the gas and composition to each respective said nozzle means simultaneously.

17. The apparatus according to claim 1 further comprising sealing means disposed proximate said nozzle means and around said outer surface of said pipe portion for substantially preventing the composition and the gas stream from flowing axially along said outer surface of said pipe portion, thereby facilitating the directing of the flow into the geologic formation.

18. The apparatus according to claim 17 wherein said sealing means contacts said outer surface of said pipe portion and the geologic formation when said apparatus is positioned within a borehole in the geologic formation.

19. The apparatus according to claim 17 wherein said apparatus is positioned within a borehole casing, and wherein said sealing means contacts said outer surface of said pipe portion and the borehole casing.

20. The apparatus according to claim 17 wherein said sealing means is disposed above said nozzle means, whereby said sealing means substantially prevents the generally upward flow of the composition and the gas stream along said outer surface of said pipe portion.

21. The apparatus according to claim 17 wherein said sealing means is disposed below said nozzle means, whereby said sealing means substantially prevents the generally downward flow of the composition and the gas stream along said outer surface of said pipe portion.

22. The apparatus according to claim 17 further comprising a first sealing means disposed above said nozzle means and a second sealing means disposed below said nozzle means, whereby said sealing means substantially prevents both upward and downward flow of the composition and the gas stream along said outer surface of said pipe portion.

23. The apparatus according to claim 22 wherein said first and second sealing means are adjustably spaced apart.

24. The apparatus according to claim 17 wherein said sealing means comprises at least one packer.

25. The apparatus according to claim 24 wherein said packer is expandable.

26. The apparatus according to claim 1 wherein said apparatus is adapted for use within a borehole casing which is provided with at least one generally transverse injection port, wherein said injection port and said exit opening are capable of being aligned to permit the flow of the composition and the gas stream therethrough and into the geologic formation.

27. The apparatus according to claim 26 further comprising closure means for selectively blocking said transverse injection port.

28. The apparatus according to claim 27 wherein said closure means is a trap door.

29. The apparatus according to claim 27 wherein said closure means is spring loaded.

30. The apparatus according to claim 27 wherein said closure means is mitral valve.

31. The apparatus according to claim 27 wherein said closure means is a one-way valve.

32. The apparatus according to claim 26 wherein said nozzle means and said pipe portion is movably disposed within the borehole casing.

33. The apparatus according to claim 26 further including sealing means disposed proximate said nozzle means and around said outer surface of said pipe portion for contacting the inner surface of the borehole casing and for substantially preventing the composition and the gas stream from flowing axially along said outer surface of said pipe portion, thereby facilitating the directing of the flow into the geologic formation.

34. The apparatus according to claim 33 wherein said sealing means is disposed both above and below said nozzle means.

35. The apparatus according to claim 1 further comprising an outer jetting pipe disposed around said pipe portion and generally spaced apart therefrom, said outer jetting pipe having an outer surface and an inner surface, said inner surface and said outer surface of said pipe portion defining a jetting annulus which is capable of allowing a jetting medium to flow therethrough, wherein the distal end of at least one of said nozzle means and said outer jetting pipe is provided with at least one jetting port through which the jetting medium is capable of exiting from said jetting annulus, whereby the jetting medium cuts into the geologic formation to form a borehole in which said apparatus is capable of being moved.

36. A system for pneumatically injecting at least one dry media composition via transport by at least one gas stream into a geologic formation, said system comprising:

conduit means for carrying the composition and the gas stream into the geologic formation, said conduit means including:
  a pipe portion for delivering the composition and the gas stream below the surface of the geologic formation, said pipe portion having a distal end, a proximal end, an inner surface which defines at least one bore/passage and an outer surface; and
  a supply portion for delivering the gas stream to said pipe portion, said supply portion including mixing means for adding the composition to the at least one gas stream, wherein said supply portion is capable of delivering both the gas stream and the composition to said pipe portion; and nozzle means attached to the distal end of said pipe portion, for directing the flow of the composition and the gas stream from said bore of said pipe portion into the geologic formation, said nozzle means including at least one exit opening, wherein the composition and the gas stream are capable of passing through said exit opening and into the geologic formation;

gas source means for supplying the at least one gas stream to said conduit means;

dry media composition source means for supplying the at least one dry media composition to said conduit means; and control means for selectively controlling the flow of the gas stream and the composition through said conduit means.

37. A system according to claim 36 wherein said control means selectively controls the flow of the gas stream from said gas source means.

38. The system according to claim 36 wherein said control means selectively controls the addition of the composition to said mixing means.

39. The system according to claim 38 wherein said control means allows the gas stream to flow into said pipe portion in a first state, whereby the gas stream is injected into the geologic formation in the first state; and
  wherein said control means allows the introduction of the composition into the gas stream in a second state, whereby both the composition and the gas stream are simultaneously injected into the geologic formation in the second state.

40. The system according to claim 39 wherein said system creates at least one void in the geologic formation in the first state.

41. The system according to claim 40 wherein said system creates at least one void in the geologic formation in the first state and maintains the void in the second state while simultaneously delivering the composition to the void.

* * * * *

UNITED STATES PATENT AND TRADEMARK OFFICE
CERTIFICATE OF CORRECTION

PATENT NO. : 6,012,517  
DATED : February 24, 1998  
INVENTOR(S) : Schuring et al.

Page 1 of 1

It is certified that error appears in the above-identified patent and that said Letters Patent is hereby corrected as shown below:

<u>Title page,</u>  
Please change the filing date from "Feb. 24, 1998" to -- Feb. 26, 1998 --

Signed and Sealed this

Twenty-third Day of April, 2002

Attest:

Attesting Officer

JAMES E. ROGAN  
*Director of the United States Patent and Trademark Office*